United States Patent
Lyu et al.

(10) Patent No.: US 11,733,485 B2
(45) Date of Patent: Aug. 22, 2023

(54) OPTICAL IMAGING LENS ASSEMBLY

(71) Applicant: Zhejiang Sunny Optical Co., Ltd, Ningbo (CN)

(72) Inventors: Saifeng Lyu, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 324 days.

(21) Appl. No.: 17/002,868

(22) Filed: Aug. 26, 2020

(65) Prior Publication Data
US 2021/0072506 A1    Mar. 11, 2021

(30) Foreign Application Priority Data

Sep. 6, 2019   (CN) .......................... 201910841668.1

(51) Int. Cl.
*G02B 9/02*       (2006.01)
*G02B 13/00*      (2006.01)
*G02B 27/00*      (2006.01)

(52) U.S. Cl.
CPC .......... *G02B 13/0025* (2013.01); *G02B 9/02* (2013.01); *G02B 27/0025* (2013.01)

(58) Field of Classification Search
CPC .. G02B 13/0025; G02B 9/02; G02B 27/0025; G02B 13/003; G02B 9/16; G02B 9/38; G02B 9/60; G02B 9/62; G02B 13/0035; G02B 13/004; G02B 9/10; G02B 13/002; G02B 13/18
See application file for complete search history.

(56) References Cited

U.S. PATENT DOCUMENTS

| 8,072,697 B1* | 12/2011 | Shih | G02B 13/003 359/717 |
| 8,194,172 B2* | 6/2012 | Tang | G02B 13/0035 359/716 |
| 8,508,860 B2* | 8/2013 | Tang | G02B 13/0045 359/764 |

(Continued)

FOREIGN PATENT DOCUMENTS

| WO | 2018/209855 A1 | 11/2018 | |
| WO | WO-2019119728 A1 * | 6/2019 | ............ G02B 13/00 |

OTHER PUBLICATIONS

Sean Setters, Do You Know Your Camera's Image Resolution? Think Again, (2017), pp. 1-6 [online], [retrieved Dec. 28, 2022], retrieved from the Internet <URL: https://www.the-digital-picture.com/News/News-Post.aspx?News=20753&Title=Do-You-Know-Your-Cameras-Image-Resolution-Think-Again-#:...20borders>. (Year: 2017).*

(Continued)

*Primary Examiner* — Thomas K Pham
*Assistant Examiner* — Wesley Scott Ashton
(74) *Attorney, Agent, or Firm* — Sughrue Mion, PLLC

(57) ABSTRACT

The present disclosure discloses an optical imaging lens assembly, and the optical imaging lens assembly includes, sequentially from an object side to an image side along an optical axis: a first lens having positive refractive power, and at least one subsequent lens having refractive power. An F-number Fno1 of the optical imaging lens assembly satisfies Fno1>3.5, where an object distance is finite, and an F-number Fno2 of the optical imaging lens assembly satisfies Fno2≥1.0, where the object distance is infinite.

17 Claims, 18 Drawing Sheets

(56) References Cited

U.S. PATENT DOCUMENTS

| | | | |
|---|---|---|---|
| 10,996,435 B2* | 5/2021 | Dai | G02B 9/64 |
| 2010/0328787 A1* | 12/2010 | Fukuta | G02B 13/0015 |
| | | | 264/1.32 |
| 2011/0102907 A1* | 5/2011 | Nakamura | G02B 15/144113 |
| | | | 359/687 |
| 2011/0279910 A1 | 11/2011 | Tang et al. | |
| 2012/0212660 A1* | 8/2012 | Tang | G02B 9/10 |
| | | | 348/E5.045 |
| 2014/0071332 A1* | 3/2014 | Kanetaka | G02B 13/0045 |
| | | | 359/708 |
| 2016/0161724 A1* | 6/2016 | Nakamura | G02B 27/0025 |
| | | | 359/687 |
| 2016/0238824 A1* | 8/2016 | Arai | G02B 15/144105 |
| 2019/0086651 A1* | 3/2019 | Okada | G02B 15/1421 |
| 2019/0113712 A1* | 4/2019 | Huang | G02B 13/004 |
| 2019/0196145 A1* | 6/2019 | Huang | G02B 13/16 |
| 2020/0371312 A1* | 11/2020 | Tang | G02B 9/06 |
| 2021/0026133 A1* | 1/2021 | Yamashita | G02B 27/0025 |

OTHER PUBLICATIONS

Jon Chouinard, What are the F-numbers on Machine Vision Lenses? F-stop Explained!, 2019, pp. 1-6 [online], [retrieved on Sep. 6, 2022], retrieved from the Internet <URL: https://www.1stvision.com/machine-vision-solutions/2019/01/machine-vision-lens-f-stop.html>. (Year: 2019).*

* cited by examiner

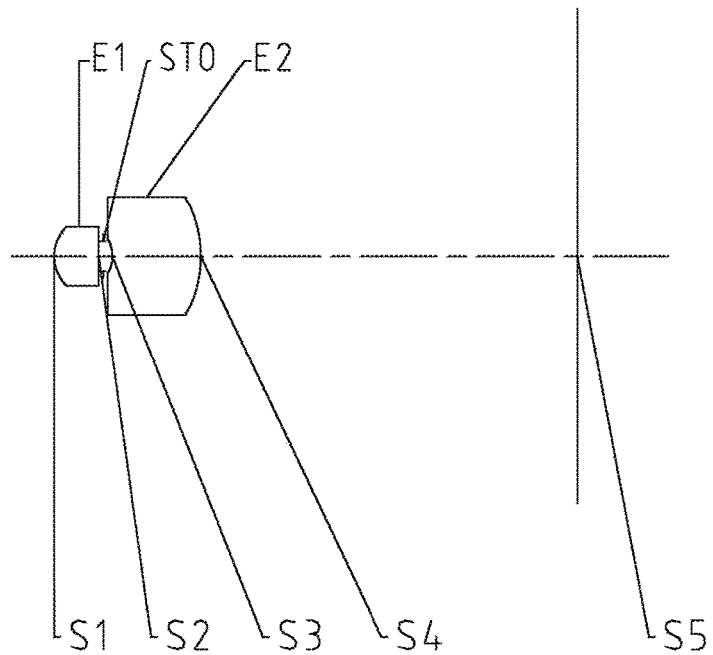
Fig. 1
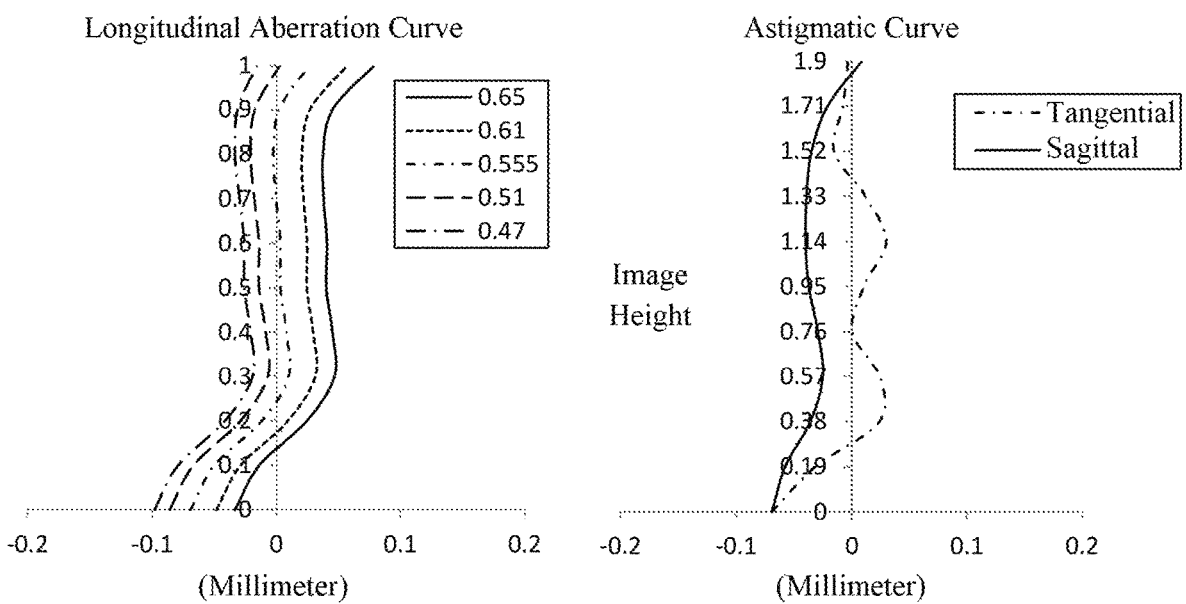
Fig. 2A
Fig. 2B

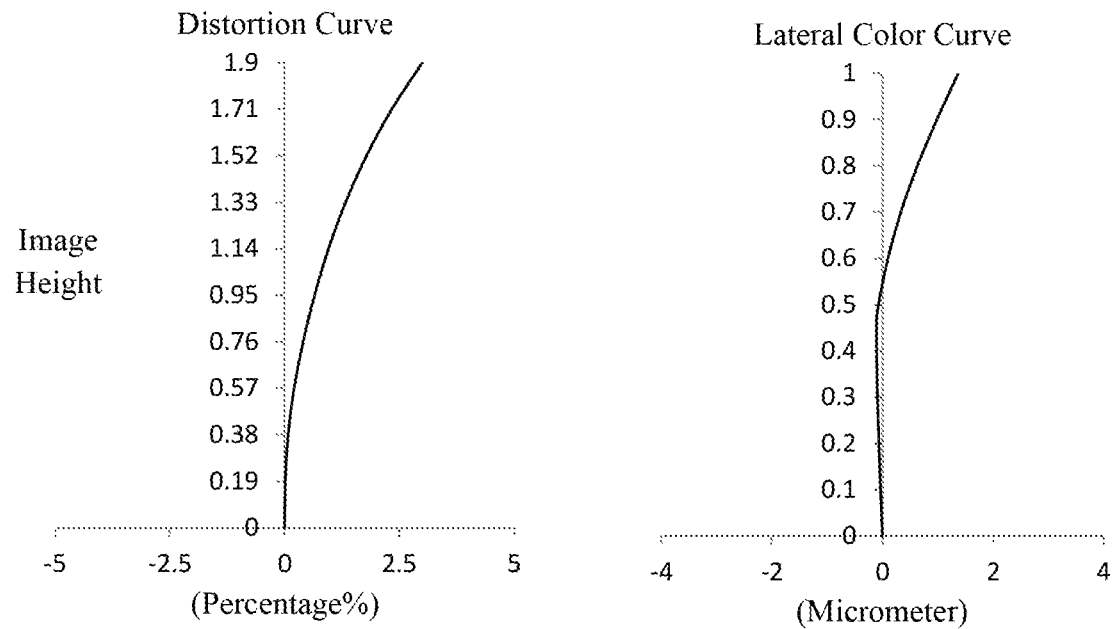
Fig. 2C
Fig. 2D
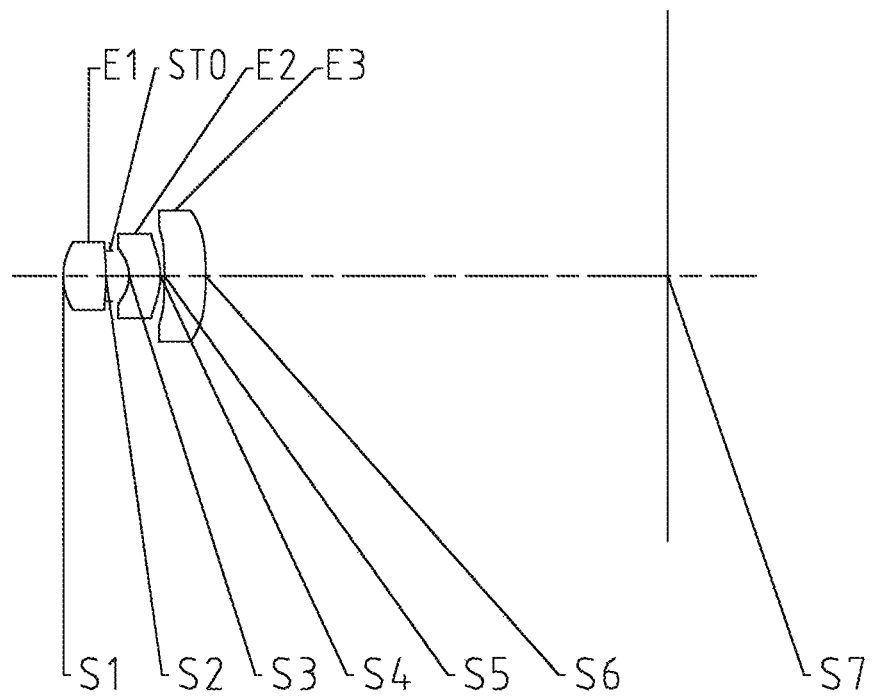
Fig. 3

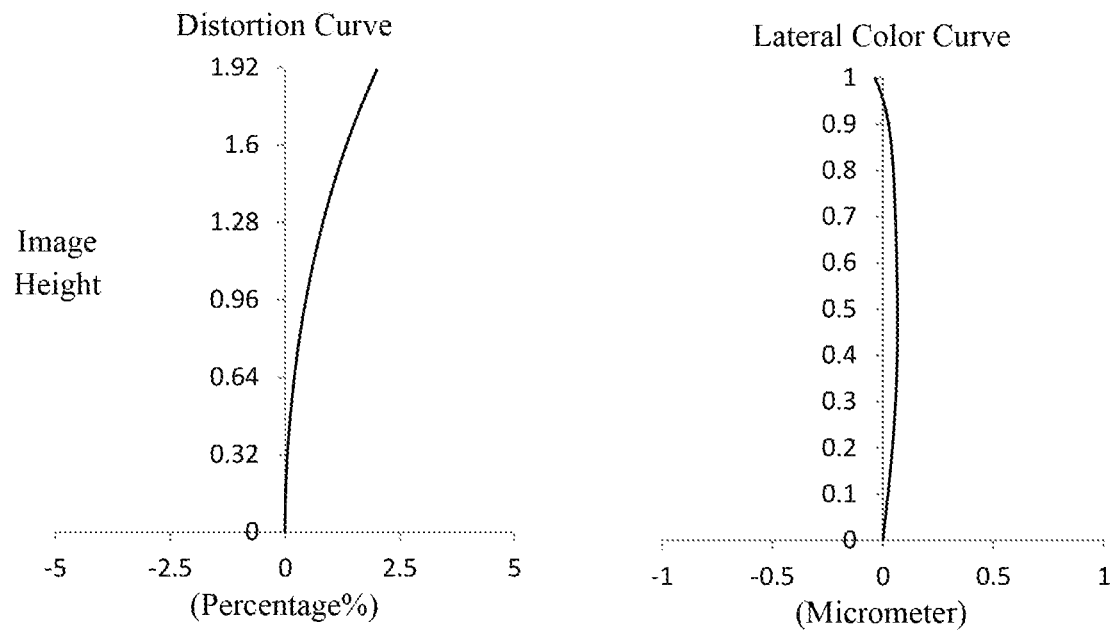
Fig. 10C
Fig. 10D
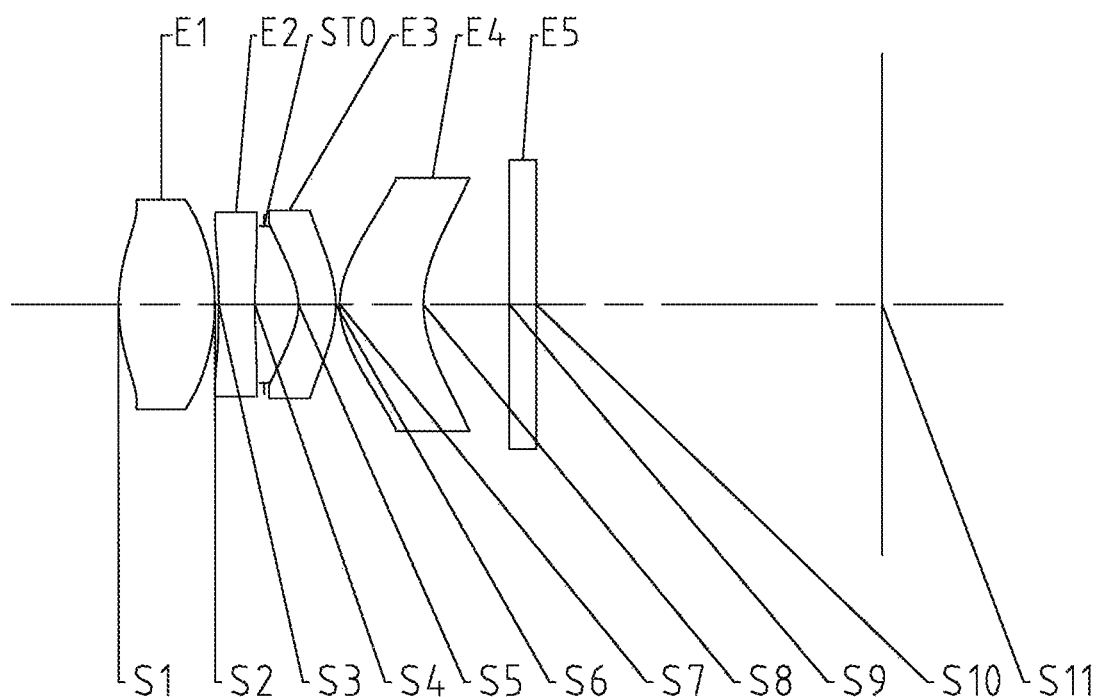
Fig. 11

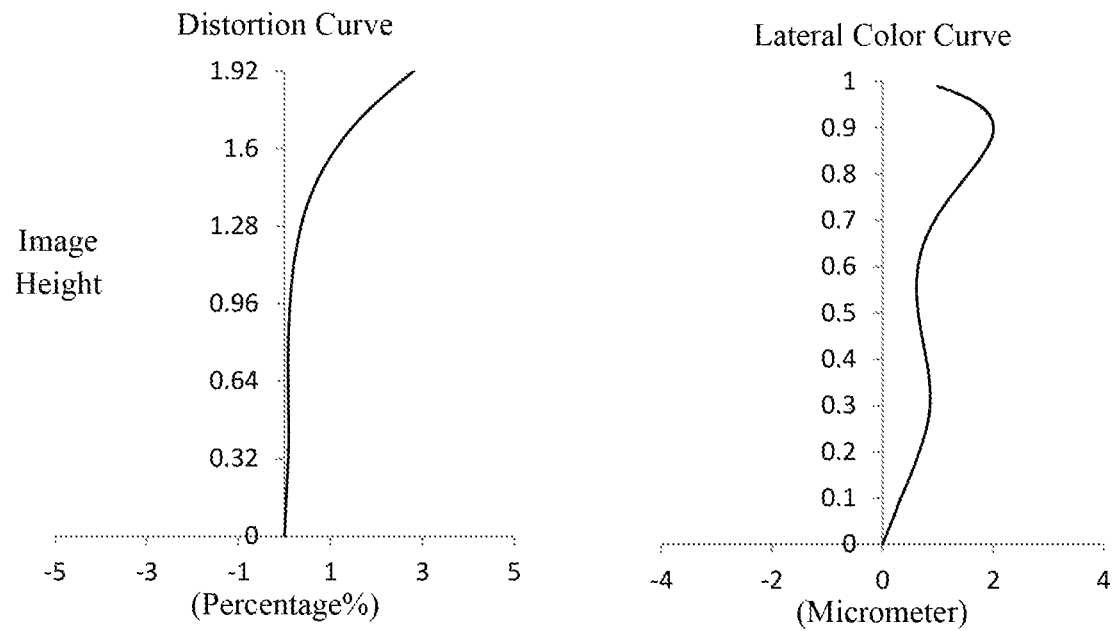
Fig. 18C
Fig. 18D
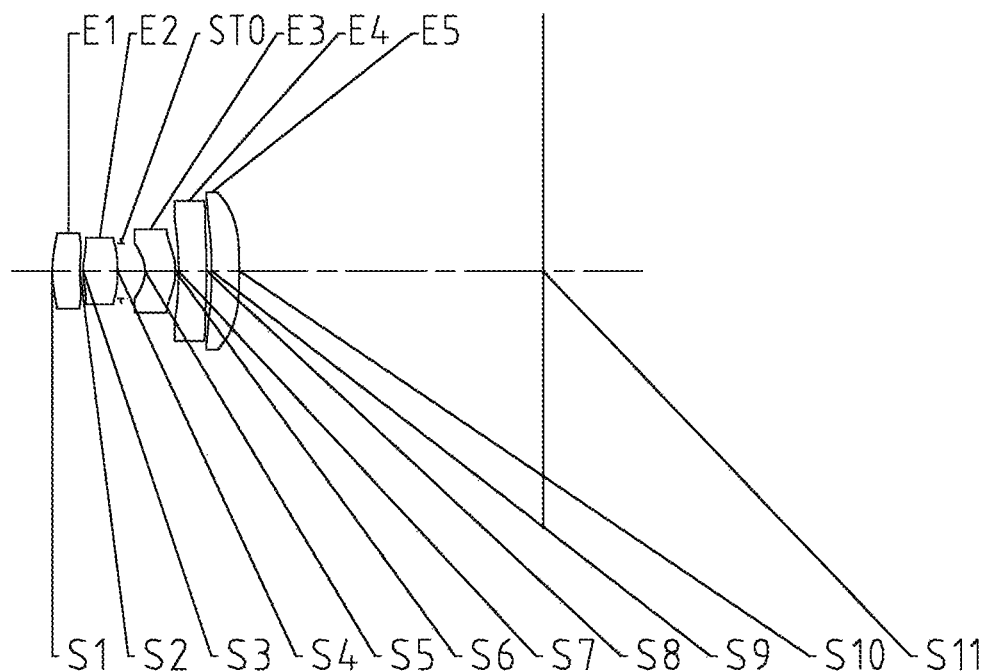
Fig. 19

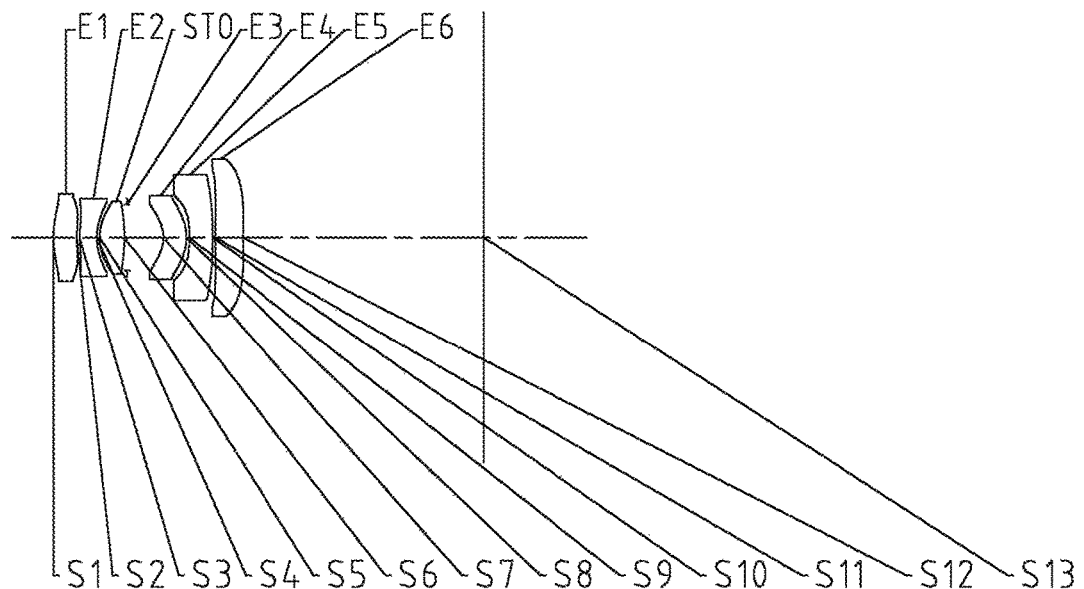
Fig. 21
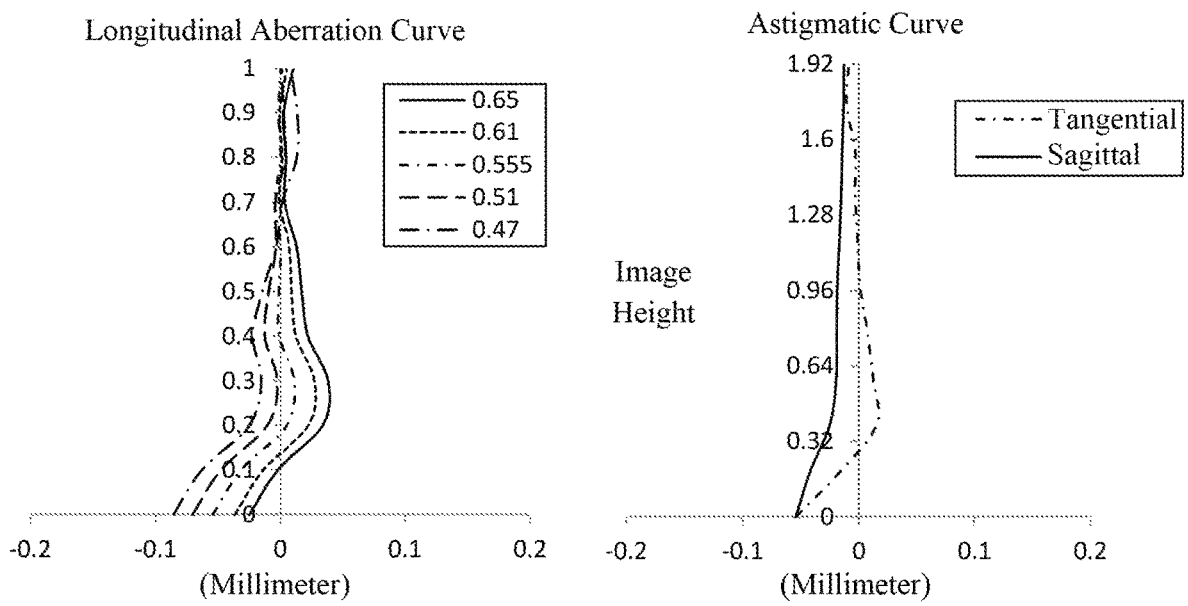
Fig. 22A
Fig. 22B

OPTICAL IMAGING LENS ASSEMBLY

CROSS-REFERENCE TO RELATED APPLICATION

This application claims benefit of priority to Chinese Patent Application No. 201910841668.1 filed on Sep. 6, 2019 before the China National Intellectual Property Administration, the entire disclosure of which is incorporated herein by reference in its entity.

TECHNICAL FIELD

The present disclosure relates to the field of optical elements, and specifically to an optical imaging lens assembly.

BACKGROUND

In recent years, with the widespread application of electronic products, such as mobile phones, computers and cameras, the market has put forward higher and higher demands for the photographing functions of these electronic products, and thus multi-camera lens groups including, for example, wide-angle lens assembly, telephoto lens assembly and large aperture lens assembly have also emerged. In this process, as a new demand of the market, macro camera has been paid more attention to. This type of optical imaging lens assembly can be used for fingerprint recognition or microscopic imaging, thereby enhancing the versatility and convenience of corresponding electronic devices.

SUMMARY

The present disclosure provides an optical imaging lens assembly including, sequentially from an object side to an image side along an optical axis, a first lens having positive refractive power; and at least one subsequent lens having refractive power.

In one implementation, half of a diagonal length ImgH of an effective pixel area on an image plane of the optical imaging lens assembly, a distance To along the optical axis from an object being photographed to an object-side surface of the first lens, and a maximal field-of-view angle FOV of the optical imaging lens assembly satisfy $ImgH/(To*Tan(FOV/2))>1.0$.

In one implementation, an F-number Fno1 of the optical imaging lens assembly satisfies $Fno1>3.5$, where an object distance is finite, and an F-number Fno2 of the optical imaging lens assembly satisfies $Fno2 \geq 1.0$, where the object distance is infinite.

In one implementation, the optical imaging lens assembly further includes a stop, and a distance Sd along the optical axis from the stop to an image-side surface of the lens closest to the image plane, and a distance Td along the optical axis from the object-side surface of the first lens to the image-side surface of the lens closest to the image plane satisfy $Sd/Td \leq 0.7$.

In one implementation, a sum $\Sigma CT$ of center thicknesses along the optical axis of all the lenses, and a distance TTL along the optical axis from the object-side surface of the first lens to the image plane of the optical imaging lens assembly satisfy $\Sigma CT/TTL<0.5$.

In one implementation, a sum $\Sigma AT$ of spaced intervals along the optical axis between each two adjacent lenses among all the lenses, and a distance Td along the optical axis from the object-side surface of the first lens to an image-side surface of the lens closest to the image plane satisfy $\Sigma AT/Td<0.3$.

In one implementation, a distance BFL along the optical axis from the image plane to an image-side surface of the lens closest to the image plane, and a distance TTL along the optical axis from the object-side surface of the first lens to the image plane of the optical imaging lens assembly satisfy $0.5<BFL/TTL<0.9$.

In one implementation, a distance TTL along the optical axis from the object-side surface of the first lens to the image plane of the optical imaging lens assembly, and a total effective focal length f of the optical imaging lens assembly satisfy $2<TTL/f<4$.

In one implementation, an effective radius DT11 of the object-side surface of the first lens, and half of a diagonal length ImgH of an effective pixel area on the image plane of the optical imaging lens assembly satisfy $DT11/ImgH<0.5$.

In one implementation, a total effective focal length f of the optical imaging lens assembly and a radius of curvature R1 of the object-side surface of the first lens satisfy $0.5<f/R1<5$.

In one implementation, a total effective focal length f of the optical imaging lens assembly and an effective focal length f1 of the first lens satisfy $0<f/f1<2.5$.

In one implementation, a number of the at least one subsequent lens having refractive power is 1, 2, 3, 4 or 5.

In one implementation, a distance TTL along the optical axis from the object-side surface of the first lens to the image plane of the optical imaging lens assembly and a distance To along the optical axis from the object being photographed to the object-side surface of the first lens satisfy $TTL/To \leq 3.0$.

In one implementation, a total effective focal length f of the optical imaging lens assembly, half of the diagonal length ImgH of the effective pixel area on the image plane of the optical imaging lens assembly, and a maximal field-of-view angle FOV of the optical imaging lens assembly satisfy $f*tan(FOV/2)/ImgH<0.5$.

The optical imaging lens assembly provided in the present disclosure employs a plurality of lenses, including a first lens having positive refractive power and at least one subsequent lens. By properly configuring the F-number of the optical imaging lens assembly in case of the object distance being finite and the F-number of the optical imaging lens assembly in case of the object distance being infinite, the imaging quality of the lens assembly at different object-distances is improved.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIG. 1 is a schematic structural view of an optical imaging lens assembly according to embodiment 1 of the present disclosure;

FIGS. 2A-2D illustrate a longitudinal aberration curve, an astigmatic curve, a distortion curve, a lateral color curve of the optical imaging lens assembly according to embodiment 1, respectively;

FIG. 3 is a schematic structural view of an optical imaging lens assembly according to embodiment 2 of the present disclosure;

FIGS. 10A-10D illustrate a longitudinal aberration curve, an astigmatic curve, a distortion curve, a lateral color curve of the optical imaging lens assembly according to embodiment 5, respectively;

FIG. 11 is a schematic structural view of an optical imaging lens assembly according to embodiment 6 of the present disclosure;

FIGS. 18A-18D illustrate a longitudinal aberration curve, an astigmatic curve, a distortion curve, a lateral color curve of the optical imaging lens assembly according to embodiment 9, respectively;

FIG. 19 is a schematic structural view of an optical imaging lens assembly according to embodiment 10 of the present disclosure;

FIG. 21 is a schematic structural view of an optical imaging lens assembly according to embodiment 11 of the present disclosure;

FIGS. 22A-22D illustrate a longitudinal aberration curve, an astigmatic curve, a distortion curve, a lateral color curve of the optical imaging lens assembly according to embodiment 11, respectively;

DETAILED DESCRIPTION OF EMBODIMENTS

Figure 4A:
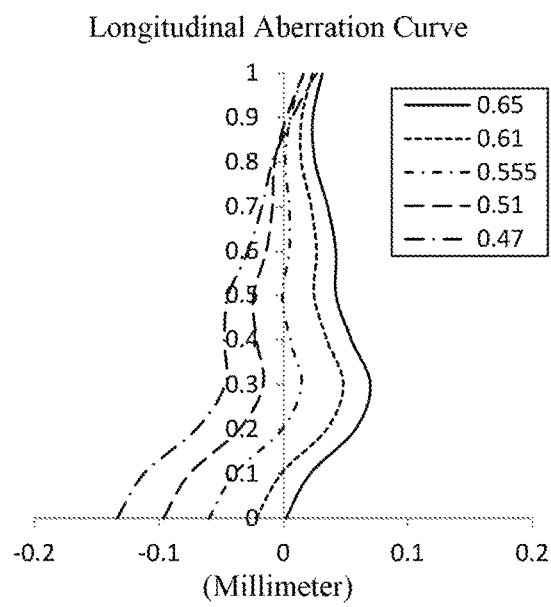
FIGS. 4A-4D illustrate a longitudinal aberration curve, an astigmatic curve, a distortion curve, a lateral color curve of the optical imaging lens assembly according to embodiment 2, respectively.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region. If a surface of a lens is a concave surface and the position of the concave is not defined, it indicates that the surface of the lens is concave at least in the paraxial region. The surface of each lens closest to the object side is referred to as an object-side surface thereof, and the surface of each lens closest to the image plane is referred to as an image-side surface thereof.

It should be further understood that the terms "comprising," "including," "having", "containing" and/or "contain", when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

According to an exemplary implementation of the present disclosure, the optical imaging lens assembly may include at least two lenses having refractive power, that is, a first lens has positive refractive power and at least one subsequent lens, which are sequentially arranged from an object side to an image side along an optical axis.

In an exemplary implementation, an F-number Fno1 of the optical imaging lens assembly satisfies Fno1>3.5, where an object distance is finite, and an F-number Fno2 of the optical imaging lens assembly satisfies Fno2>1.0, where an object distance is infinite. The F-number of the optical imaging lens assembly in the case of the object distance being finite is larger than 3.5, and the F-number of the optical imaging lens assembly in the case of the object distance being infinite is larger than or equal to 1.0. The optical imaging lens assembly with a larger F-number is not only beneficial to ensuring sufficient luminous flux at the edge field-of-view and improving the luminance at the image plane, but also beneficial to reducing the size of the front aperture of the optical imaging lens assembly and improving the overall appearance of electronic products applied to the optical imaging lens assembly.

In an exemplary implementation, the optical imaging lens assembly further includes a stop, and a distance Sd along the optical axis from the stop to an image-side surface of the lens closest to an image plane, and a distance Td along the optical axis from an object-side surface of the first lens to the image-side surface of the lens closest to the image plane satisfy Sd/Td≤0.7. By properly configuring the ratio of the distance along the optical axis from the stop to the image-side surface of the lens closest to the image plane with respect to the distance along the optical axis from an object-side surface of the first lens to the image-side surface of the lens closest to the image plane, it is not only beneficial to reduce the apertures of the lenses in front of and behind the stop and the sensitivities thereof, but also beneficial to obtain a proper amplification factor via properly controlling the object distance.

In an exemplary implementation, a sum $\Sigma CT$ of center thicknesses along the optical axis of all the lenses, and a distance TTL along the optical axis from an object-side surface of the first lens to an image plane of the optical imaging lens assembly satisfy ICT/TTL<0.5. In the present disclosure, the distance along the optical axis from the object-side surface of the first lens to the image plane of the optical imaging lens assembly is also referred as the total optical length of the optical imaging lens assembly. By properly configuring the ratio of the sum of center thicknesses along the optical axis of all the lenses with respect to the total optical length of the optical imaging lens assembly, the processability of all the lenses having refractive power are advantageously ensured while realizing the ultra-thin size for the optical imaging lens assembly through controlling the range of the center thicknesses of all the lenses.

In an exemplary implementation, a sum $\Sigma AT$ of spaced intervals along the optical axis between each two adjacent lenses among all the lenses, and Td, being a distance along the optical axis from an object-side surface of the first lens to an image-side surface of the lens having refractive power and being closest to an image plane, satisfy $\Sigma AT/Td<0.3$. By properly configuring the sum of the spaced intervals along the optical axis between each two adjacent lenses among all the lenses and the ratio of this sum with respect to the distance along the optical axis from the object-side surface of the first lens to the image-side surface of the lens having the refractive power and being closest to an image plane, it is not only beneficial to avoid the lenses being squeezed and deformed during assembling due to the small spaced intervals between the lenses, but also beneficial to avoid the need for too many spacers due to the excessive spaced interval between the lenses, so that the cost of the lens assembly can be effectively reduced.

In an exemplary implementation, a distance BFL along the optical axis from an image plane to an image-side surface of the lens closest to the image plane, and a distance TTL along the optical axis from an object-side surface of the first lens to the image plane of the optical imaging lens assembly satisfy 0.5<BFL/TTL<0.9. In the present disclosure, the distance along the optical axis from the image plane of the optical imaging lens assembly to the image-side surface of the lens having refractive power and being closest to the image plane is also referred as the back focal length of the optical imaging lens assembly. Properly configuring the ratio of the back focal length of the optical imaging lens assembly with respect to the total optical length, is not only beneficial to ensuring a relatively small aperture at the rear end of the optical imaging lens assembly, but also beneficial to avoiding a relatively large incidence angle of the chief light with respect to the image plane, so as to achieve better matching with the chief light of the chip.

In an exemplary implementation, a distance TTL along the optical axis from an object-side surface of the first lens to an image plane of the optical imaging lens assembly, and a total effective focal length f of the optical imaging lens assembly satisfy 2<TTL/f<4. By properly configuring the ratio of the total optical distance of the optical imaging lens assembly with respect to the total effective focal length of the optical imaging lens assembly, the amplification factor of the optical imaging lens assembly and the depth of field of the optical imaging lens assembly in which clear imaging can be achieved may be controlled even in the case that relatively small size of the optical imaging lens assembly is realized.

In an exemplary implementation, an effective radius DT11 of the object-side surface of the first lens, and half of a diagonal length ImgH of an effective pixel area on an image plane of the optical imaging lens assembly satisfy DT11/ImgH<0.5. By properly configuring the ratio of the effective radius of the object-side surface of the first lens with respect to half of the diagonal length of the effective pixel area on the image plane of the optical imaging lens assembly, an excessively large aperture at the object-side surface of the first lens and the difficulty in processing due to the excessively large aperture at the object-side surface of the first lens can be effectively avoid. At the same time, by reducing the size of the aperture at front end of the system as much as possible while ensuring sufficient luminous flux, a relatively small size at the front end of the optical imaging lens assembly is advantageously ensured.

In an exemplary implementation, a total effective focal length f of the optical imaging lens assembly and a radius of curvature R1 of an object-side surface of the first lens satisfy 0.5<f/R1<5. Configuring the ratio of the total effective focal length of the optical imaging lens assembly with respect to the radius of curvature of the object-side surface of the first lens to be within an appropriate range, is not only beneficial to ensuring that the first lens effectively receives light with relatively large incident angle, but also beneficial to avoiding excessively large deflection angle of light at the object-side surface of the first lens, so as to reduce the sensitivity of the object-side surface.

In an exemplary implementation, a total effective focal length f of the optical imaging lens assembly and an effective focal length f1 of the first lens satisfy 0<f/f1<2.5. Properly configuring the ratio of the total effective focal length of the optical imaging lens assembly with respect to the effective focal length of the first lens, is not only beneficial to avoiding the refractive powers excessively concentrated on the first lens and reducing the sensitivity of the first lens, but also beneficial to avoiding the excessively large deflection angle of light in the first lens and the strong total-reflection ghost-image caused by the excessively large deflection angle of light in the first lens.

In an exemplary implementation, a number of the at least one subsequent lens having refractive power is 1 to 5. The number of the subsequent lenses can be selectively disposed according to the different object distances needed for photographing.

In one implementation, a distance TTL along the optical axis from an object-side surface of the first lens to an image plane of the optical imaging lens assembly and a distance To along the optical axis from an object being photographed to the object-side surface of the first lens satisfy TTL/To≤3.0. By properly selecting the distance from the object being photographed to the object-side surface of the first lens, a proper amplification effect can be ensured, so that a good photographing effect can be achieved for relatively small objects.

In one implementation, half of a diagonal length ImgH of an effective pixel area on an image plane of the optical imaging lens assembly, a distance To along the optical axis from an object being photographed to an object-side surface of the first lens, and a maximal field-of-view angle FOV of the optical imaging lens assembly satisfy ImgH/(To*Tan(FOV/2))>1.0. By properly configuring the above parameters, a proper amplification effect can be ensured for the optical imaging lens assembly, so that detail information about the object can be obtained as much as possible, thereby improving the resolution of the image.

In one implementation, a total effective focal length f of the optical imaging lens assembly, half of the diagonal length ImgH of an effective pixel area on an image plane of the optical imaging lens assembly, and a maximal field-of-view angle FOV of the optical imaging lens assembly satisfy f*tan(FOV/2)/ImgH<0.5. Appropriate configuration of the above parameters can not only ensure that the optical imaging lens assembly has a large enough image plane to present more detailed information about the object being photographed, but also ensure that the optical system has a relatively small focal length, thereby achieving amplification effect.

In an exemplary implementation, a stop may be disposed at a appropriate position as needed. For example, the stop may be disposed between the first lens and the second lens when the subsequent lens(es) is(are) one lens or two lenses; the stop may be disposed between the second lens and the third lens when the subsequent lenses are three lenses or four lenses; or the stop may be disposed between the third lenses and the fourth lenses when the subsequent lenses are five lenses. Alternatively, the optical imaging lens assembly described above may further include an optical filter for correcting chromatic aberration and/or a protective glass for protecting a photosensitive element on the image plane.

In an exemplary implementation, the surfaces of each lens may be aspheric, or may be spherical. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using an aspheric lens, the aberrations that occur during imaging can be eliminated as much as possible, and thus improving the imaging quality.

The present disclosure further provides an imaging apparatus, having a photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The exemplary implementation of the present disclosure further provides an electronic device including the imaging apparatus described above.

However, it will be understood by those skilled in the art that the number of lenses constituting the optical imaging lens assembly can be varied to achieve the various results and advantages described in this specification without departing from the technical solution claimed by the present disclosure. For example, although the implementation are described by taking two to six lenses as examples, the optical imaging lens assembly is not limited to including two to six lenses. The optical imaging lens assembly can also include other numbers of lenses if desired.

Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of an optical imaging lens assembly according to embodiment 1 of the present disclosure.

As shown in FIG. 1, the optical imaging lens assembly includes, sequentially from an object side to an image side along an optical axis: a first lens E1, a stop STO, a second lens E2, and an image plane S5.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a convex surface. Light from the object sequentially passes through the respective surfaces S1 to S4 and is finally imaged on the image plane S5.

Table 1 is a table showing the basic parameters of the optical imaging lens assembly of the embodiment 1, wherein the units for the radius of curvature, the thickness/distance and the focal length are millimeter (mm).

TABLE 1

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 1.8509 | | | | |
| S1 | aspheric | 0.3095 | 0.3460 | 1.54 | 56.0 | 0.61 | −0.6925 |
| S2 | aspheric | 3.2443 | 0.0365 | | | | −55.6081 |
| STO | spherical | infinite | 0.0682 | | | | 0.0000 |
| S3 | aspheric | −0.3175 | 0.6812 | 1.67 | 20.0 | −1.17 | 1.9378 |
| S4 | aspheric | −0.9923 | 2.8988 | | | | −2.6369 |
| S5 | spherical | infinite | | | | | |

In this embodiment, a total effective focal length f of the optical imaging lens assembly satisfies f=1.23 mm, and a distance TTL along the optical axis from the object-side surface S1 of the first lens E1 to the image plane S5 satisfies TTL=4.03 mm.

In the embodiment 1, the object-side surface and the image-side surface of any one of the first lens E1 to the second lens E2 are aspheric. In this embodiment, the surface shape x of each aspheric lens can be defined by using, but not limited to, the following aspheric formula:

$$x = \frac{ch^2}{1 + \sqrt{1 - (k+1)c^2 h^2}} + \sum A_i h^i \quad (1)$$

Here, x is the sag—the axis-component of the displacement of the aspheric surface from the aspheric vertex, when the surface is at height h from the optical axis; c is the paraxial curvature of the aspheric surface, c=1/R (that is, the paraxial curvature c is reciprocal of the radius of curvature R in the above Table 1); k is the conic coefficient; Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S4 in embodiment 1.

TABLE 2

| Surface number | A4 | A6 | A8 | A10 | 12 |
|---|---|---|---|---|---|
| S1 | 1.2891E+00 | 2.3307E+02 | −2.5962E+04 | 1.8536E+06 | −8.2675E+07 |
| S2 | 1.4989E+00 | −1.8903E+03 | 5.5973E+05 | −1.0164E+08 | 1.1163E+10 |
| S3 | −5.4289E+00 | 9.2536E+02 | −2.8343E+05 | 4.8319E+07 | −5.1454E+09 |
| S4 | −4.8413E−01 | −3.2429E+00 | 7.2214E+01 | −1.0467E+03 | 9.6193E+03 |

| Surface number | A14 | A16 | A18 | A20 |
|---|---|---|---|---|
| S1 | 2.3219E+09 | −3.9832E+10 | 3.8084E+11 | −1.5545E+12 |
| S2 | −7.4969E+11 | 2.9824E+13 | −6.3839E+14 | 5.5767E+15 |
| S3 | 3.4187E+11 | −1.3821E+13 | 3.0928E+14 | −2.9165E+15 |
| S4 | −5.6645E+04 | 2.0773E+05 | −4.3426E+05 | 3.9692E+05 |

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatic curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion corresponding to different image heights. FIG. 2D illustrates a lateral color curve of the optical imaging lens assembly according to embodiment 1, representing deviations of different image heights on an image plane after light passes through the optical imaging lens assembly. It can be seen from FIG. 2A to FIG. 2D that the optical imaging lens assembly provided in embodiment 1 can achieve good image quality.

Embodiment 2

An optical imaging lens assembly according to embodiment 2 of the present disclosure is described below with reference to FIG. 3 to FIG. 4D. FIG. 3 is a schematic structural view of the optical imaging lens assembly according to embodiment 2 of the present disclosure.

As shown in FIG. 3, the optical imaging lens assembly includes, sequentially from an object side to an image side along an optical axis: a first lens E1, a stop STO, a second lens E2, a third lens E3, and an image plane S7.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a convex surface. The third lens E3 has positive refractive power, an object-side surface S5 thereof is concave surface, and an image-side surface S6 thereof is a convex surface. Light from the object sequentially passes through the respective surfaces S1 to S6 and is finally imaged on the image plane S7.

In this embodiment, a total effective focal length f of the optical imaging lens assembly satisfies f=1.40 mm, and a distance TTL along the optical axis from the object-side surface S1 of the first lens E1 to the image plane S7 satisfies TTL=4.44 mm.

Table 3 is a table showing the basic parameters of the optical imaging lens assembly of the embodiment 2, wherein the units for the radius of curvature, the thickness/distance and the focal length are millimeter (mm).

TABLE 3

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 2.0009 | | | | |
| S1 | aspheric | 0.4532 | 0.3131 | 1.54 | 56.0 | 0.75 | −1.1591 |
| S2 | aspheric | −2.7837 | 0.0300 | | | | 21.5444 |
| STO | spherical | infinite | 0.1406 | | | | 0.0000 |
| S3 | aspheric | −0.2526 | 0.2300 | 1.67 | 20.0 | −1.61 | −0.2490 |
| S4 | aspheric | −0.4499 | 0.0300 | | | | −8.1319 |
| S5 | aspheric | −2.7451 | 0.3027 | 1.62 | 25.5 | 29.77 | 19.9073 |
| S6 | aspheric | −2.4918 | 3.3894 | | | | 3.7438 |
| S7 | spherical | infinite | | | | | |

In the embodiment 2, the object-side surface and the image-side surface of any one of the first lens E1 to the third lens E3 are aspheric. Table 4 below shows high-order coefficients $A_4$, $A_6$, $A_8$, $A_{10}$, $A_{12}$, $A_{14}$, $A_{16}$, $A_{18}$ and Am applicable to each aspheric surface S1-S6 in embodiment 2.

TABLE 4

| Surface number | A4 | A6 | A8 | A10 | A12 |
|---|---|---|---|---|---|
| S1 | 6.3484E−01 | 1.4358E+02 | −1.4315E+04 | 8.2659E+05 | −2.9314E+07 |
| S2 | −9.8971E−01 | −3.1025E+01 | −2.0226E+03 | 3.9720E+05 | −3.0715E+07 |
| S3 | 8.0139E+00 | 1.7800E+02 | −3.0242E+04 | 2.3095E+06 | −9.9769E+07 |
| S4 | 8.5270E−01 | −1.8625E+02 | 8.4913E+03 | −2.5666E+05 | 5.3256E+06 |
| S5 | 6.7281E+00 | −3.3602E+02 | 9.2624E+03 | −1.9522E+05 | 2.9516E+06 |
| S6 | −8.9244E−01 | −5.9931E+00 | 1.1831E+02 | −1.8614E+03 | 1.9382E+04 |

| Surface number | A14 | A16 | A18 | A20 |
|---|---|---|---|---|
| S1 | 6.4540E+08 | −8.6051E+09 | 6.3561E+10 | −1.9961E+11 |
| S2 | 1.2206E+09 | −2.6473E+10 | 2.9591E+11 | −1.3220E+12 |
| S3 | 2.4851E+09 | −3.2584E+10 | 1.5985E+11 | 2.6974E+11 |
| S4 | −7.1395E+07 | 5.8516E+08 | −2.6259E+09 | 4.8758E+09 |
| S5 | −3.0170E+07 | 1.9537E+08 | −7.1424E+08 | 1.1141E+09 |
| S6 | −1.2895E+05 | 5.2440E+05 | −1.1850E+06 | 1.1421E+06 |

Figure 4B:
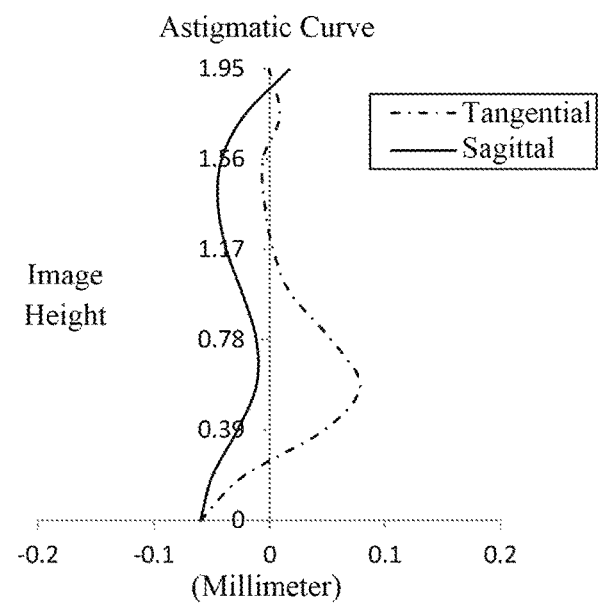
Figure 4C:
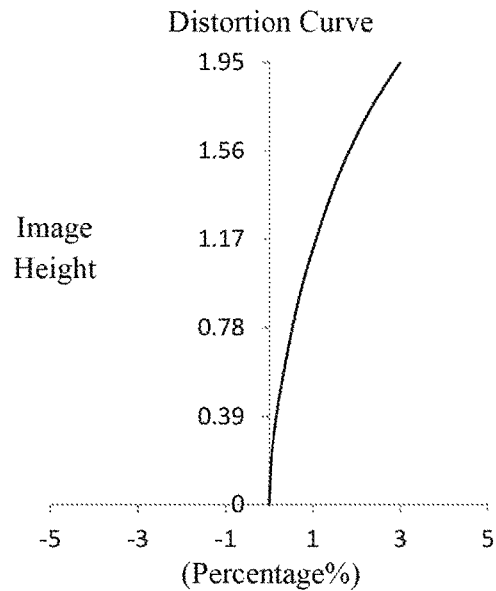
Figure 4D:
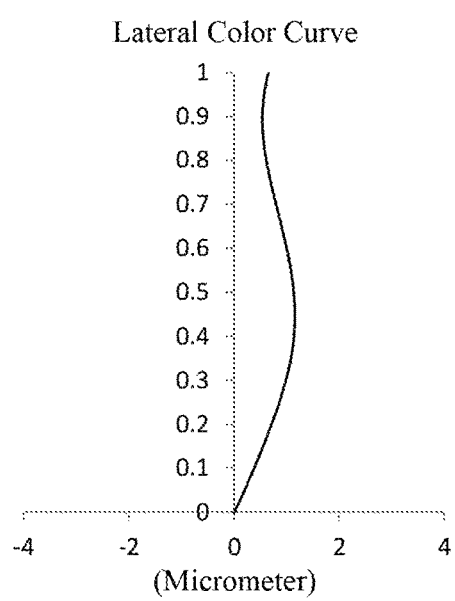

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatic curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion corresponding to different image heights. FIG. 4D illustrates a lateral color curve of the optical imaging lens assembly according to embodiment 2, representing deviations of different image heights on an image plane after light passes through the optical imaging lens assembly. It can be seen from FIG. 4A to FIG. 4D that the optical imaging lens assembly provided in embodiment 2 can achieve good image quality.

Embodiment 3

Figure 5:
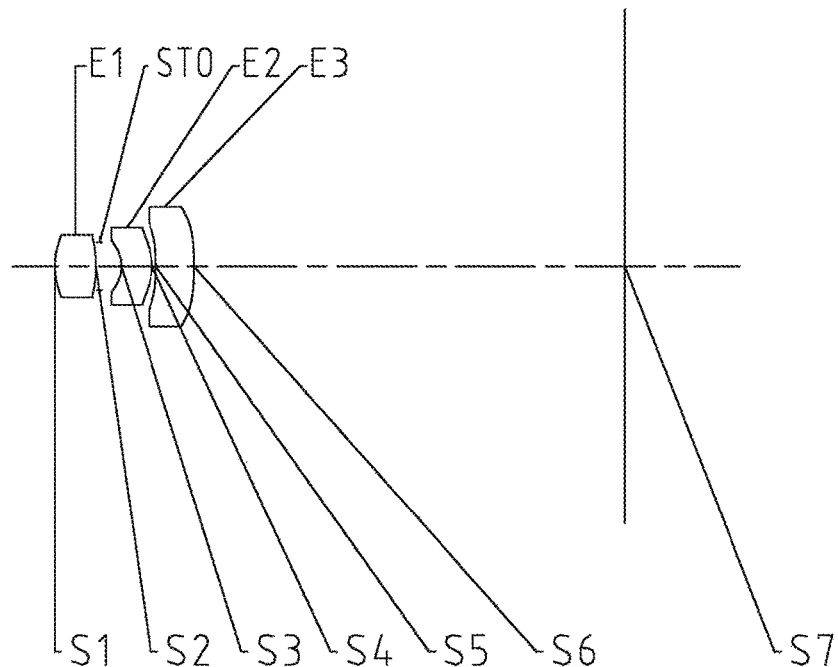
FIG. 5 is a schematic structural view of an optical imaging lens assembly according to embodiment 3 of the present disclosure.

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly includes, sequentially from an object side to an image side along an optical axis: a first lens E1, a stop STO, a second lens E2, a third lens E3, and an image plane S7.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a convex surface. The third lens E3 has negative refractive power, an object-side surface S5 thereof is concave surface, and an image-side surface S6 thereof is a convex surface. Light from the object sequentially passes through the respective surfaces S1 to S6 and is finally imaged on the image plane S7.

In this embodiment, a total effective focal length f of the optical imaging lens assembly satisfies f=1.38 mm, and a distance TTL along the optical axis from the object-side surface S1 of the first lens E1 to the image plane S7 satisfies TTL=4.30 mm.

Table 5 is a table showing the basic parameters of the optical imaging lens assembly of the embodiment 3, wherein the units for the radius of curvature, the thickness/distance and the focal length are millimeter (mm).

TABLE 5

| Surface number | Surface type | Radius of curvature | Thickness/ distance | Material Refractive index | Abbe number | Focal length | Conic coefficient |
| --- | --- | --- | --- | --- | --- | --- | --- |
| OBJ | spherical | infinite | 2.0009 | | | | |
| S1 | aspheric | 0.5314 | 0.3094 | 1.54 | 56.0 | 0.73 | −2.3550 |
| S2 | aspheric | −1.1808 | 0.0300 | | | | 16.2880 |
| STO | spherical | infinite | 0.1635 | | | | |
| S3 | aspheric | −0.2479 | 0.2320 | 1.67 | 20.0 | −1.95 | −0.3165 |
| S4 | aspheric | −0.4205 | 0.0300 | | | | −6.3116 |
| S5 | aspheric | −2.3188 | 0.2880 | 1.66 | 20.8 | −10.57 | 38.2532 |
| S6 | aspheric | −3.6395 | 3.2516 | | | | −75.7763 |
| S7 | spherical | infinite | | | | | |

In the embodiment 3, the object-side surface and the image-side surface of any one of the first lens E1 to the third lens E3 are aspheric. Table 6 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S6 in embodiment 3.

TABLE 6

| Surface number | A4 | A6 | A8 | A10 | A12 |
| --- | --- | --- | --- | --- | --- |
| S1 | 6.0336E−01 | 7.8064E+01 | −8.6497E+03 | 4.7332E+05 | −1.5542E+07 |
| S2 | −9.6291E−01 | −9.2608E+01 | 1.0699E+04 | −7.7189E+05 | 3.2943E+07 |
| S3 | 7.3443E+00 | 1.6208E+02 | −2.1279E+04 | 2.0402E+06 | −1.1643E+08 |
| S4 | −6.0684E+00 | 3.8863E+01 | 3.8033E+03 | −1.7870E+05 | 4.4643E+06 |
| S5 | −1.9130E+00 | −6.7653E+01 | 3.3692E+03 | −9.9623E+04 | 1.8834E+06 |
| S6 | −2.2222E+00 | 3.3439E+00 | 3.5268E+01 | −8.3014E+02 | 7.9425E+03 |

| Surface number | A14 | A16 | A18 | A20 |
| --- | --- | --- | --- | --- |
| S1 | 3.0185E+08 | −3.2850E+09 | 1.6981E+10 | −2.3641E+10 |
| S2 | −8.4171E+08 | 1.2582E+10 | −1.0063E+11 | 3.3109E+11 |
| S3 | 4.1256E+09 | −8.8394E+10 | 1.0497E+12 | −5.3104E+12 |
| S4 | −6.7220E+07 | 6.0986E+08 | −3.0364E+09 | 6.2865E+09 |
| S5 | −2.2616E+07 | 1.6710E+08 | −6.8434E+08 | 1.1793E+09 |
| S6 | −4.4111E+04 | 1.4226E+05 | −2.3756E+05 | 1.4479E+05 |

Figures 6A, 6B:
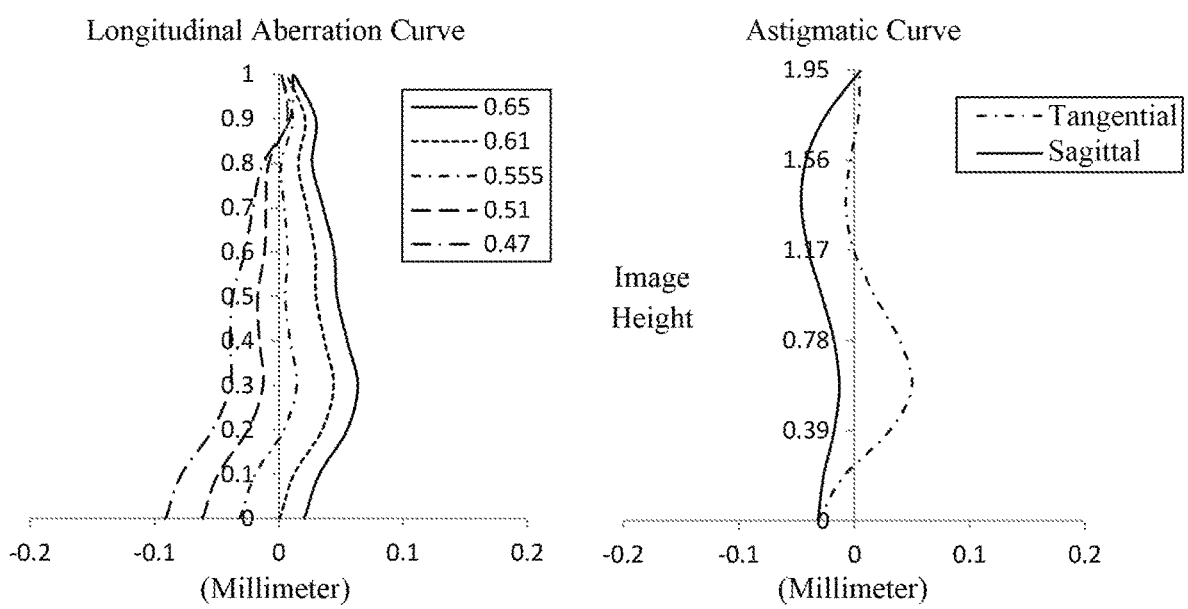
FIGS. 6A-6D illustrate a longitudinal aberration curve, an astigmatic curve, a distortion curve, a lateral color curve of the optical imaging lens assembly according to embodiment 3, respectively.
Figure 6C:
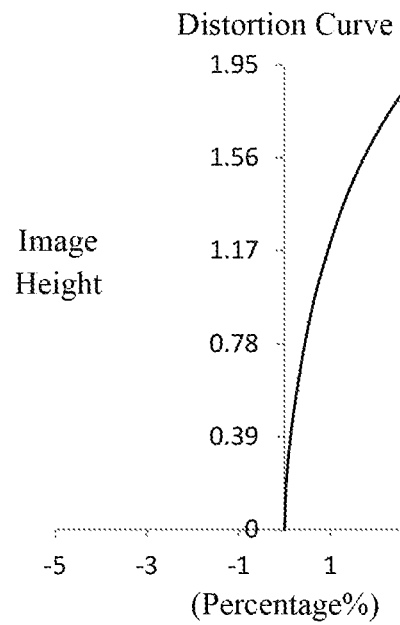
Figure 6D:
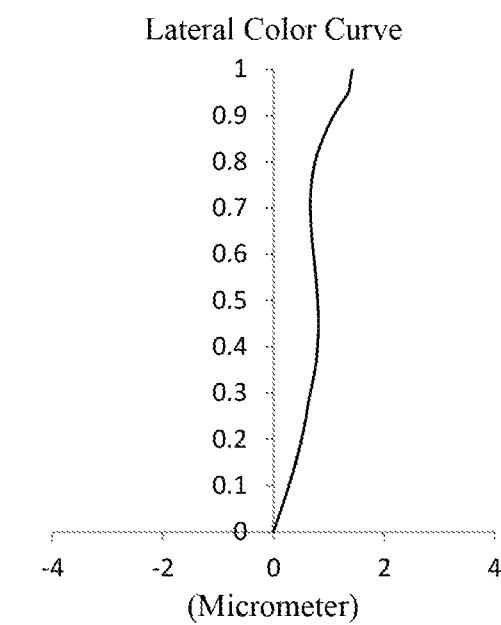

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatic curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion corresponding to different image heights. FIG. 6D illustrates a lateral color curve of the optical imaging lens assembly according to embodiment 3, representing deviations of different image heights on an image plane after light passes through the optical imaging lens assembly. It can be seen from FIG. 6A to FIG. 6D that the optical imaging lens assembly provided in embodiment 3 can achieve good image quality.

Embodiment 4

Figure 7:
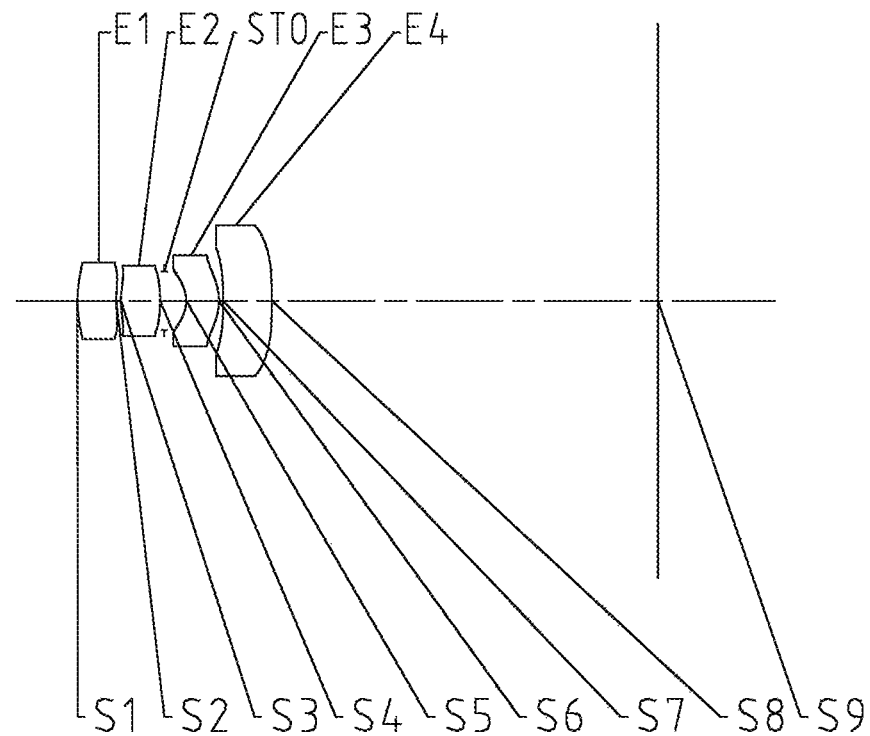
FIG. 7 is a schematic structural view of an optical imaging lens assembly according to embodiment 4 of the present disclosure.

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly includes, sequentially from an object side to an image side along an optical axis: a first lens E1, a second lens E2, a stop STO, a third lens E3, a fourth lens E4 and an image plane S9.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is concave surface, and an image-side surface S6 thereof is a convex surface. The fourth lens E4 has negative refractive power, an object-side surface S7 thereof is concave surface, and an image-side surface S8 thereof is a convex surface. Light from the object sequentially passes through the respective surfaces 51 to S8 and is finally imaged on the image plane S9.

In this embodiment, a total effective focal length f of the optical imaging lens assembly satisfies f=1.45 mm, and a distance TTL along the optical axis from the object-side surface S1 of the first lens E1 to the image plane S9 satisfies TTL=4.09 mm.

Table 7 is a table showing the basic parameters of the optical imaging lens assembly of the embodiment 4, wherein the units for the radius of curvature, the thickness/distance and the focal length are millimeter (mm).

TABLE 7

| Surface number | Surface type | Radius of curvature | Thickness/ distance | Material Refractive index | Material Abbe number | Focal length | Conic coefficient |
|---|---|---|---|---|---|---|---|
| OBJ | spherical | infinite | 2.2089 | | | | |
| S1 | aspheric | 0.8412 | 0.2737 | 1.54 | 56.0 | 8.43 | −5.0620 |
| S2 | aspheric | 0.9149 | 0.0328 | | | | 0.4889 |
| S3 | aspheric | 0.5720 | 0.2755 | 1.54 | 56.0 | 0.77 | −12.5074 |
| S4 | aspheric | −1.2260 | 0.0300 | | | | 20.8571 |
| STO | spherical | infinite | 0.1543 | | | | |
| S5 | aspheric | −0.2349 | 0.2308 | 1.67 | 20.0 | −2.40 | −0.3683 |
| S6 | aspheric | −0.3835 | 0.0300 | | | | −10.8215 |
| S7 | aspheric | −3.4908 | 0.3418 | 1.67 | 20.0 | −8.47 | 73.8888 |
| S8 | aspheric | −9.3398 | 2.7185 | | | | −61.2325 |
| S9 | spherical | infinite | | | | | |

In the embodiment 4, the object-side surface and the image-side surface of any one of the first lens E1 to the fourth lens E4 are aspheric. Table 8 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S8 in embodiment 4.

TABLE 8

| Surface number | A4 | A6 | A8 | A10 | A12 |
|---|---|---|---|---|---|
| S1 | −6.6265E+01 | 4.3350E+01 | −3.0006E+03 | 1.1432E+05 | −2.7869E+06 |
| S2 | −1.4483E+01 | S.6903E+01 | −5.4901E+02 | 2.6407E+03 | −8.1184E+03 |
| S3 | −5.5833E+00 | −7.4605E+01 | 1.5594E+03 | −2.0799E+04 | 1.6467E+05 |
| S4 | −1.8122E+00 | −8.5658E+01 | 9.7734E+03 | −6.9741E+05 | 3.0536E+07 |
| S5 | 8.5795E+00 | 2.7061E+02 | −2.6446E+04 | 2.0650E+06 | −9.6317E+07 |
| S6 | −2.0637E+01 | 7.0572E+02 | −1.8556E+04 | 3.9013E+05 | −5.8169E+06 |
| S7 | −4.2223E+00 | 1.0086E+02 | −2.4622E+03 | 4.5019E+04 | −5.5451E+05 |
| S8 | −2.3666E+00 | 1.2839E+01 | −9.6846E+01 | 6.5050E+02 | −3.3279E+03 |

| Surface number | A14 | A16 | A18 | A20 |
|---|---|---|---|---|
| S1 | 4.3169E−07 | −4.1273E+08 | 2.2219E+09 | −5.1631E+09 |
| S2 | 1.5324E+04 | −1.7215E+04 | 1.0573E+04 | −2.7349E+03 |
| S3 | −7.4299E+05 | 1.8929E+06 | −2.5453E+06 | 1.4074E+06 |
| S4 | −8.1440E+08 | 1.3064E+10 | −1.1607E+11 | 4.4155E+11 |
| S5 | 2.7624E+09 | −4.7561E+10 | 4.5022E+11 | −1.7980E+12 |
| S6 | 5.8501E+07 | −3.7482E+08 | 1.3676E+09 | −2.1435E+09 |
| S7 | 4.4360E+06 | −2.1844E+07 | 5.9269E+07 | −6.9969E+07 |
| S8 | 1.1286E+04 | −2.2622E+04 | 2.1745E+04 | −5.4329E+03 |

Figure 8A:
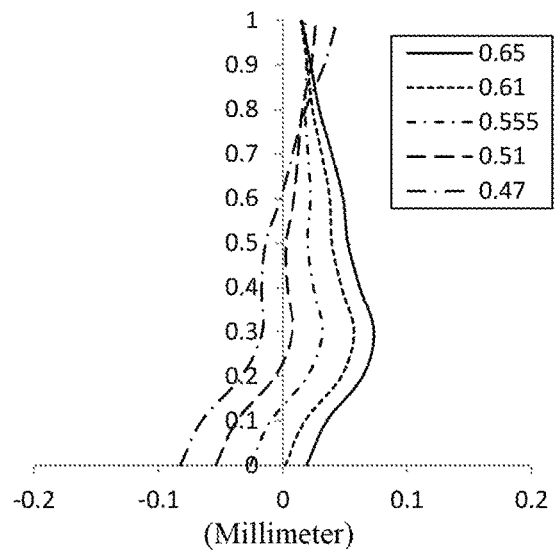
FIGS. 8A-8D illustrate a longitudinal aberration curve, an astigmatic curve, a distortion curve, a lateral color curve of the optical imaging lens assembly according to embodiment 4, respectively.
Figure 8B:
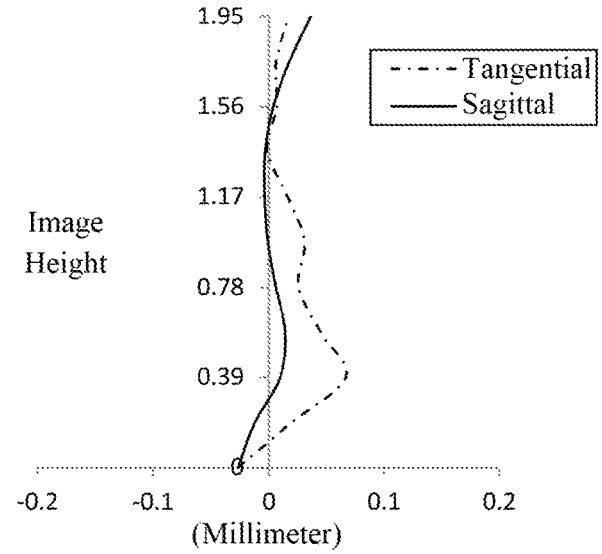
Figure 8C:
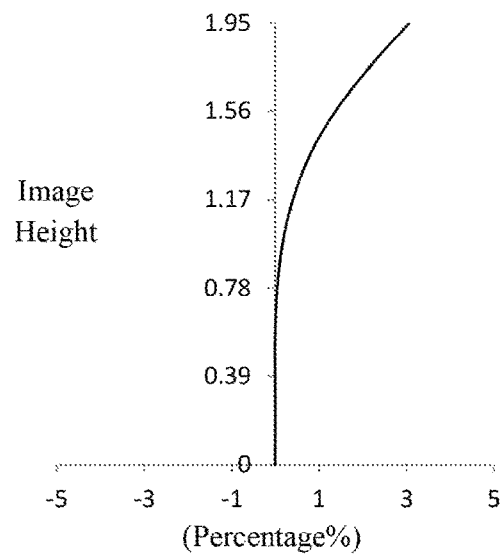
Figure 8D:
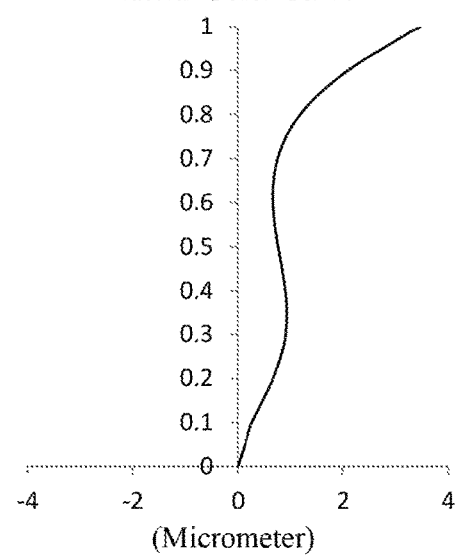

FIG. 8A illustrates a longitudinal aberration curve of the optical imaging lens assembly according to embodiment 4, representing deviations of focal points converged by light of different wavelengths after passing through the optical imaging lens assembly. FIG. 8B illustrates an astigmatic curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion corresponding to different image heights. FIG. 8D illustrates a lateral color curve of the optical imaging lens assembly according to embodiment 4, representing deviations of different image heights on an image plane after light passes through the optical imaging lens assembly. It can be seen from FIG. 8A to FIG. 8D that the optical imaging lens assembly provided in embodiment 4 can achieve good image quality.

Embodiment 5

Figure 9:
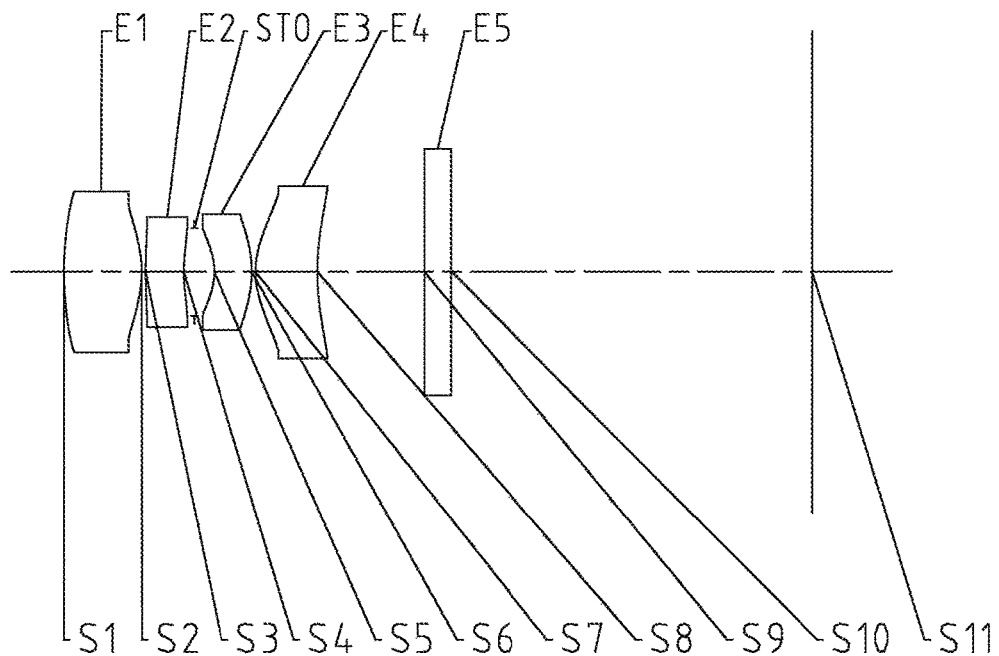
FIG. 9 is a schematic structural view of an optical imaging lens assembly according to embodiment 5 of the present disclosure.

An optical imaging lens assembly according to embodiment 9 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly includes, sequentially from an object side to an image side along an optical axis: a first lens E1, a second lens E2, a stop STO, a third lens E3, a fourth lens E4, an optical filter E5 and an image plane S11.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has negative refractive power, an object-side surface S5 thereof is concave surface, and an image-side surface S6 thereof is a convex surface. The fourth lens E4 has positive refractive power, an object-side surface S7 thereof is convex surface, and an image-side surface S8 thereof is a concave surface. The optical filter E5 has an object-side surface S9 and an image-side surface S10. Light from the object sequentially passes through the respective surfaces S1 to S10 and is finally imaged on the image plane S11.

In this embodiment, a total effective focal length f of the optical imaging lens assembly satisfies f=1.74 mm, and a distance TTL along the optical axis from the object-side surface S1 of the first lens E1 to the image plane S11 satisfies TTL=5.93 mm.

Table 9 is a table showing the basic parameters of the optical imaging lens assembly of the embodiment 5, wherein the units for the radius of curvature, the thickness/distance and the focal length are millimeter (mm).

TABLE 9

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 2.0344 | | | | |
| S1 | aspheric | 2.7747 | 0.6148 | 1.54 | 56.1 | 1.37 | −9.2194 |
| S2 | aspheric | −0.9387 | 0.0300 | | | | −7.9314 |
| S3 | aspheric | 3.8326 | 0.3029 | 1.66 | 20.4 | −3.39 | −99.0000 |
| S4 | aspheric | 1.3702 | 0.0839 | | | | −17.4651 |
| STO | spherical | infinite | 0.1578 | | | | 0.0000 |
| S5 | aspheric | −0.4651 | 0.3000 | 1.66 | 20.4 | −1.92 | −4.3040 |
| S6 | aspheric | −0.9232 | 0.0300 | | | | −6.4178 |
| S7 | aspheric | 0.6603 | 0.4885 | 1.54 | 56.1 | 1.59 | −4.4469 |
| S8 | aspheric | 2.0478 | 0.8468 | | | | −2.3809 |
| S9 | spherical | infinite | 0.2100 | 1.52 | 64.2 | | |
| S10 | spherical | infinite | 2.8652 | | | | |
| S11 | spherical | infinite | | | | | |

In the embodiment 5, the object-side surface and the image-side surface of any one of the first lens E1 to the fourth lens E4 are aspheric. Table 10 below shows high-order coefficients $A_4, A_6, A_8, A_{10}$ applicable to each aspheric surface S1-S8 in embodiment 5.

TABLE 10

| Surface number | A4 | A6 | A8 | A10 |
|---|---|---|---|---|
| S1 | 5.9267E−03 | 1.2030E−01 | −9.6993E−02 | 7.2197E−01 |
| S2 | −2.2017E−01 | 1.5093E+00 | −4.1724E+00 | 7.1253E+00 |
| S3 | −1.3687E−01 | −3.3845E−01 | 0.0000E+00 | 0.0000E+00 |
| S4 | −6.4708E−01 | −3.0846E−02 | 1.9790E+00 | −6.7140E+00 |
| S5 | 9.3049E−02 | 5.8262E−01 | 9.7251E−01 | −1.7735E+00 |
| S6 | −2.1329E−01 | 8.4329E−01 | 0.0000E+00 | 0.0000E+00 |
| S7 | −7.2495E−02 | 3.4935E−01 | −1.5910E+00 | 1.3958E+00 |
| S8 | −1.5055E−01 | 3.6264E−01 | −1.1311E+00 | 8.8684E−01 |

Figures 10A, 10B:
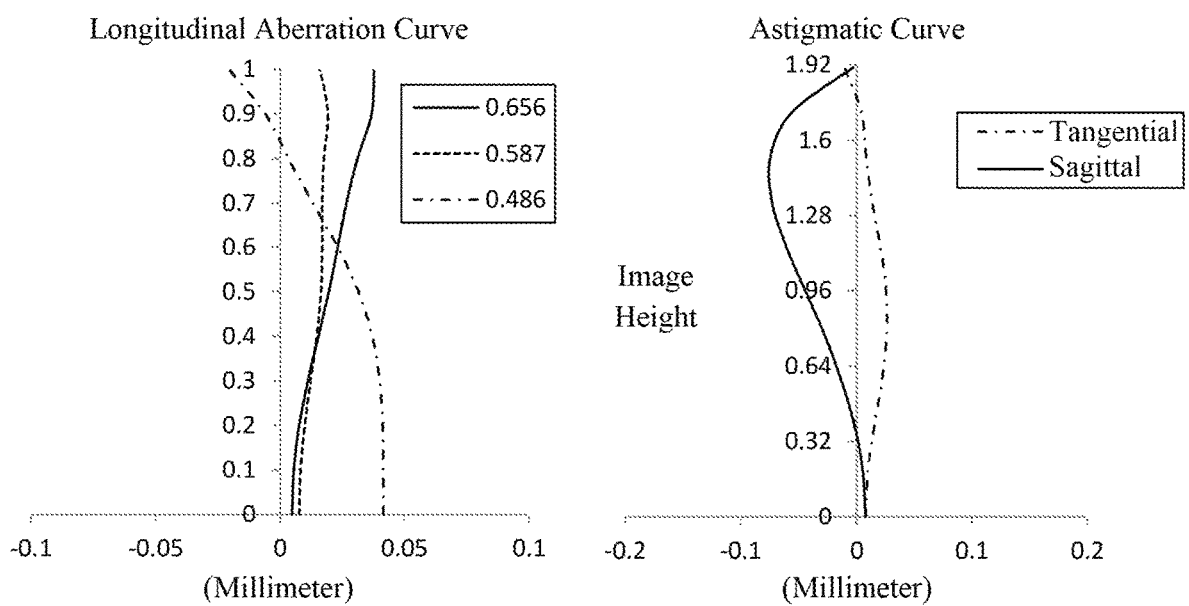

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatic curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion corresponding to different image heights. FIG. 10D illustrates a lateral color curve of the optical imaging lens assembly according to embodiment 5, representing deviations of different image heights on an image plane after light passes through the optical imaging lens assembly. It can be seen from FIG. 10A to FIG. 10D that the optical imaging lens assembly provided in embodiment 5 can achieve good image quality.

Embodiment 6

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly includes, sequentially from an object side to an image side along an optical axis: a first lens E1, a second lens E2, a stop STO, a third lens E3, a fourth lens E4, a fifth lens E5 and an image plane S11.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a concave surface. The third lens E3 has negative refractive power, an object-side surface S5 thereof is concave surface, and an image-side surface S6 thereof is a convex surface. The fourth lens E4 has positive refractive power, an object-side surface S7 thereof is convex surface, and an image-side surface S8 thereof is a concave surface. The optical filter E5 has an object-side surface S9 and an image-side surface S10. Light from the object sequentially passes through the respective surfaces S1 to S10 and is finally imaged on the image plane S11.

In this embodiment, a total effective focal length f of the optical imaging lens assembly satisfies f=1.74 mm, and a distance TTL along the optical axis from the object-side surface S1 of the first lens E1 to the image plane S11 satisfies TTL=5.93 mm.

Table 11 is a table showing the basic parameters of the optical imaging lens assembly of the embodiment 6, wherein the units for the radius of curvature, the thickness/distance and the focal length are millimeter (mm).

TABLE 11

| Surface number | Surface type | Radius of curvature | Thickness/ distance | Material Refractive index | Material Abbe number | Focal length | Conic coefficient |
|---|---|---|---|---|---|---|---|
| OBJ | spherical | infinite | 2.3669 | | | | |
| S1 | aspheric | 1.3988 | 0.7480 | 1.54 | 56.1 | 1.47 | −8.2519 |
| S2 | aspheric | −1.5194 | 0.0300 | | | | −5.3379 |
| S3 | aspheric | −10.9679 | 0.2800 | 1.66 | 20.4 | −4.17 | 30.0000 |
| S4 | aspheric | 3.7565 | 0.0721 | | | | −1.4813 |
| STO | spherical | infinite | 0.2667 | | | | 0.0000 |
| S5 | aspheric | −0.4710 | 0.2900 | 1.66 | 20.4 | −2.30 | −4.1190 |
| S6 | aspheric | −0.8474 | 0.0300 | | | | −5.7814 |
| S7 | aspheric | 0.5919 | 0.6512 | 1.54 | 56.1 | 1.81 | −3.4582 |
| S8 | aspheric | 0.9058 | 0.6668 | | | | −1.5836 |
| S9 | spherical | infinite | 0.2100 | 1.52 | 64.2 | | |
| S10 | spherical | infinite | 2.6851 | | | | |
| S11 | spherical | infinite | | | | | |

In the embodiment 6, the object-side surface and the image-side surface of any one of the first lens E1 to the fourth lens E4 are aspheric. Table 12 below shows high-order coefficients $A_4$, $A_6$, $A_8$, $A_{10}$, $A_{12}$, $A_{14}$, $A_{16}$ and $A_{18}$ applicable to each aspheric surface S1-S8 in embodiment 6.

Figure 13:
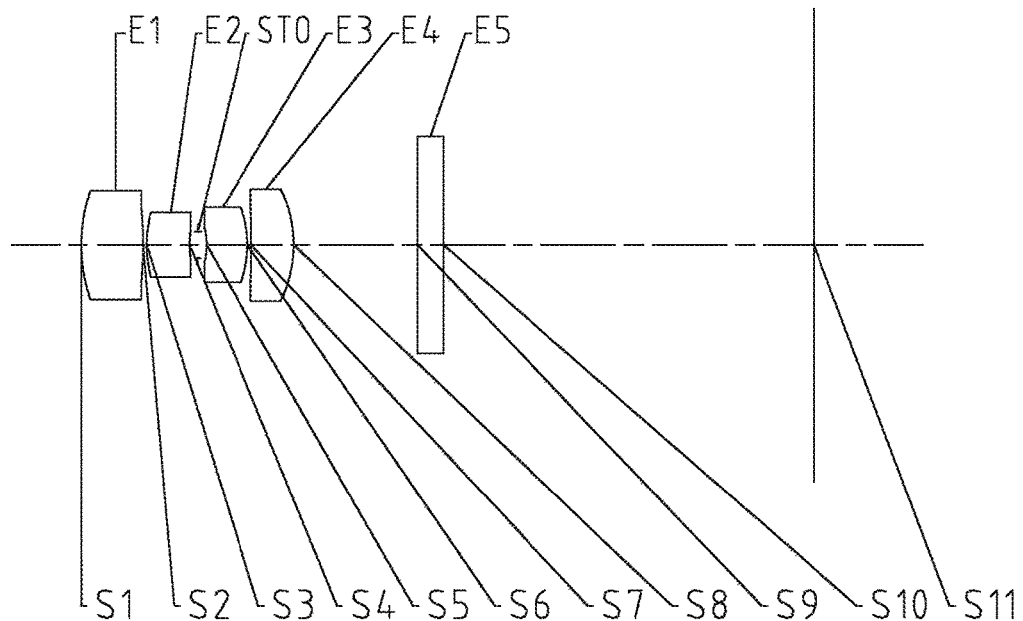
FIG. 13 is a schematic structural view of an optical imaging lens assembly according to embodiment 7 of the present disclosure.

As shown in FIG. 13, the optical imaging lens assembly includes, sequentially from an object side to an image side along an optical axis: a first lens E1, a second lens E2, a stop STO, a third lens E3, a fourth lens E4, an optical filter E5 and an image plane S11.

TABLE 12

| Surface number | A4 | A6 | A8 | A10 | A12 | A14 | A16 | A18 |
|---|---|---|---|---|---|---|---|---|
| S1 | 2.7100E−01 | −5.3536E−01 | −2.0756E−01 | 1.9862E+00 | −4.4221E+00 | 3.0522E+00 | | |
| S2 | −8.0398E−02 | −1.4886E−01 | 6.5145E−01 | −1.9584E+00 | 2.2484E+00 | −7.4639E−01 | | |
| S3 | −3.3156E−01 | 6.2645E−01 | 1.2284E+00 | −4.4176E+00 | 3.6678E+00 | 3.8441E−01 | | |
| S4 | −5.2632E−01 | 9.5407E−01 | 2.4471E−01 | 4.3118E−01 | −1.0648E+01 | 1.2094E+01 | | |
| S5 | 5.6177E−03 | −7.9333E−01 | 8.9425E+00 | −3.1963E+01 | 5.1450E+01 | −3.5048E+01 | | |
| S6 | −2.9589E−01 | 8.4058E−01 | 5.2277E−01 | −5.6305E+00 | 9.8272E+00 | −5.6687E+00 | | |
| S7 | 1.0910E−01 | 1.9773E−01 | −1.5261E+00 | 3.7590E+00 | −5.7303E+00 | 5.4046E+00 | −2.7843E+00 | 5.7781E−01 |
| S8 | −2.6685E−01 | 8.4110E−01 | −2.1930E+00 | 3.3366E+00 | −3.0086E+00 | 1.4143E+00 | −1.4308E−01 | −9.5834E−02 |

Figure 12A:
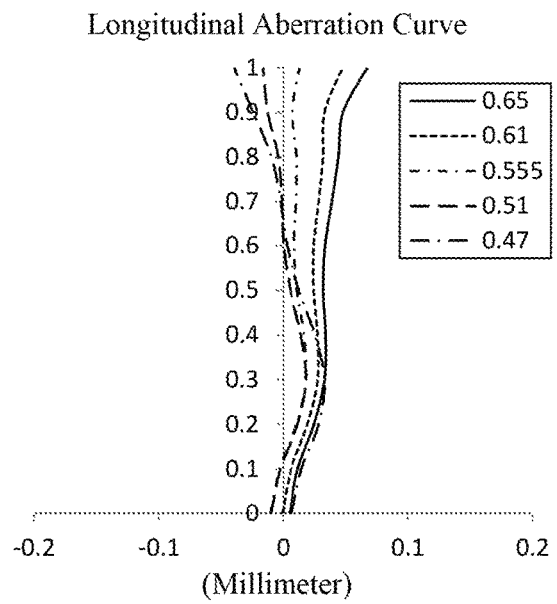
FIGS. 12A-12D illustrate a longitudinal aberration curve, an astigmatic curve, a distortion curve, a lateral color curve of the optical imaging lens assembly according to embodiment 6, respectively.
Figure 12B:
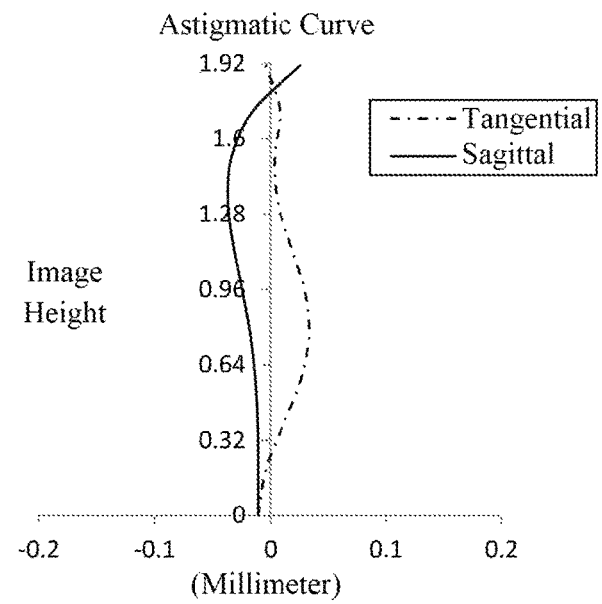
Figure 12C:
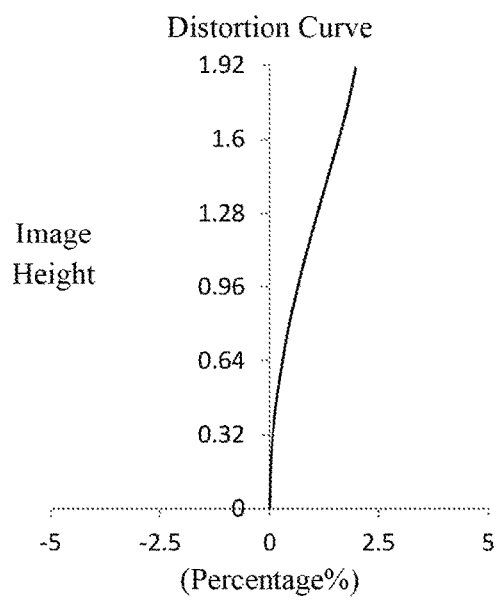
Figure 12D:
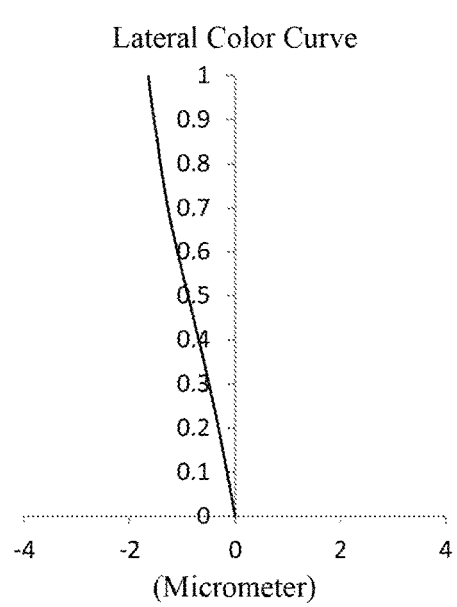

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatic curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion corresponding to different image heights. FIG. 12D illustrates a lateral color curve of the optical imaging lens assembly according to embodiment 6, representing deviations of different image heights on an image plane after light passes through the optical imaging lens assembly. It can be seen from FIG. 12A to FIG. 12D that the optical imaging lens assembly provided in embodiment 6 can achieve good image quality.

Embodiment 7

An optical imaging lens assembly according to embodiment 7 of the present disclosure is described below with reference to FIG. 13 to FIG. 14D. FIG. 13 is a schematic structural view of the optical imaging lens assembly according to embodiment 7 of the present disclosure.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has negative refractive power, an object-side surface S5 thereof is concave surface, and an image-side surface S6 thereof is a convex surface. The fourth lens E4 has positive refractive power, an object-side surface S7 thereof is concave surface, and an image-side surface S8 thereof is a convex surface. The optical filter E5 has an object-side surface S9 and an image-side surface S10. Light from the object sequentially passes through the respective surfaces S1 to S10 and is finally imaged on the image plane S11.

In this embodiment, a total effective focal length f of the optical imaging lens assembly satisfies f=1.84 mm, and a distance TTL along the optical axis from the object-side surface S1 of the first lens E1 to the image plane S11 satisfies TTL=5.93 mm.

Table 13 is a table showing the basic parameters of the optical imaging lens assembly of the embodiment 7, wherein the units for the radius of curvature, the thickness/distance and the focal length are millimeter (mm).

TABLE 13

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 1.9471 | | | | |
| S1 | spherical | 1.4092 | 0.4986 | 1.54 | 56.1 | 1.84 | 0.0000 |
| S2 | spherical | −3.0037 | 0.0300 | | | | 0.0000 |
| S3 | spherical | 1.0940 | 0.3457 | 1.66 | 20.4 | −5.46 | 0.0000 |
| S4 | spherical | 0.7338 | 0.0665 | | | | 0.0000 |
| STO | spherical | infinite | 0.0715 | | | | |
| S5 | spherical | −0.5828 | 0.3324 | 1.66 | 20.4 | −4.10 | 0.0000 |
| S6 | spherical | −0.9108 | 0.0300 | | | | 0.0000 |
| S7 | spherical | −25.2587 | 0.3454 | 1.54 | 56.1 | 2.00 | 0.0000 |
| S8 | spherical | −1.0479 | 1.0000 | | | | 0.0000 |
| S9 | spherical | infinite | 0.2100 | 1.52 | 64.2 | | |
| S10 | spherical | infinite | 3.0000 | | | | |
| S11 | spherical | infinite | | | | | |

Figure 14A:
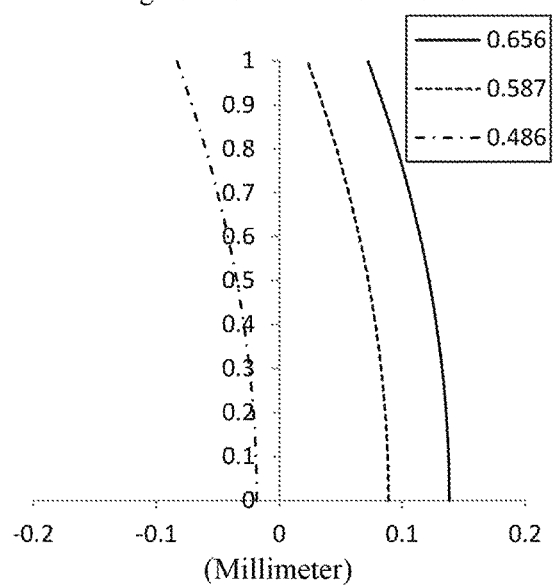
FIGS. 14A-14D illustrate a longitudinal aberration curve, an astigmatic curve, a distortion curve, a lateral color curve of the optical imaging lens assembly according to embodiment 7, respectively.
Figure 14B:
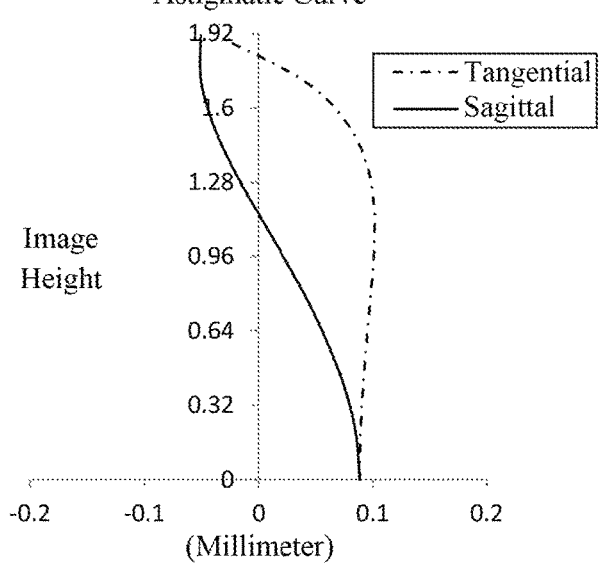
Figures 14C, 14D:
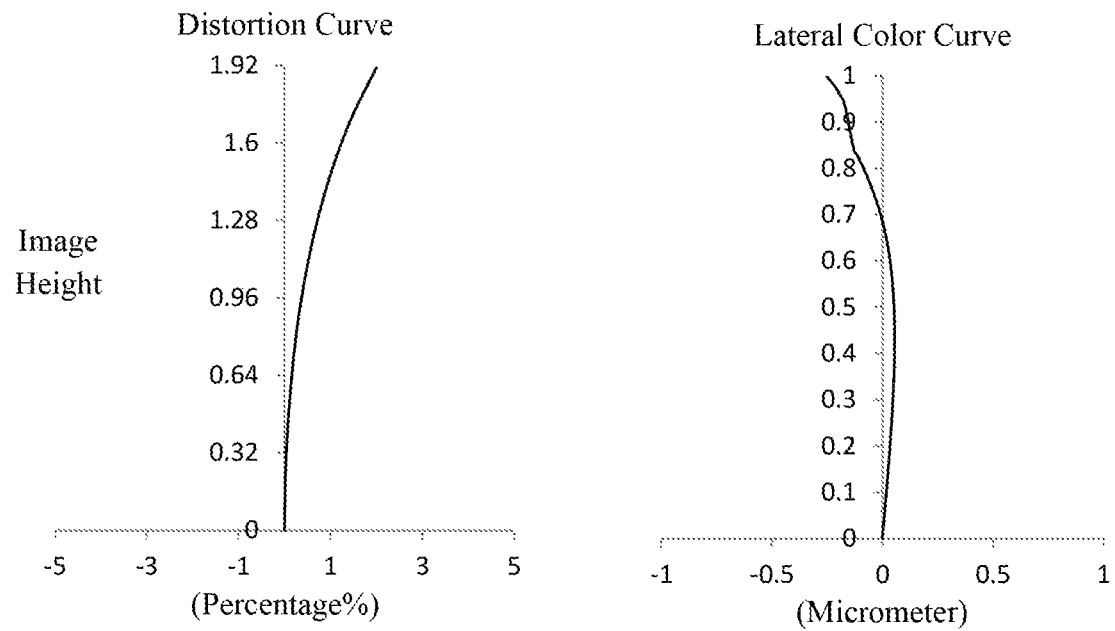

FIG. 14A illustrates a longitudinal aberration curve of the optical imaging lens assembly according to embodiment 7, representing deviations of focal points converged by light of different wavelengths after passing through the optical imaging lens assembly. FIG. 14B illustrates an astigmatic curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion corresponding to different image heights. FIG. 14D illustrates a lateral color curve of the optical imaging lens assembly according to embodiment 7, representing deviations of different image heights on an image plane after light passes through the optical imaging lens assembly. It can be seen from FIG. 14A to FIG. 14D that the optical imaging lens assembly provided in embodiment 7 can achieve good image quality.

Embodiment 8

Figure 15:
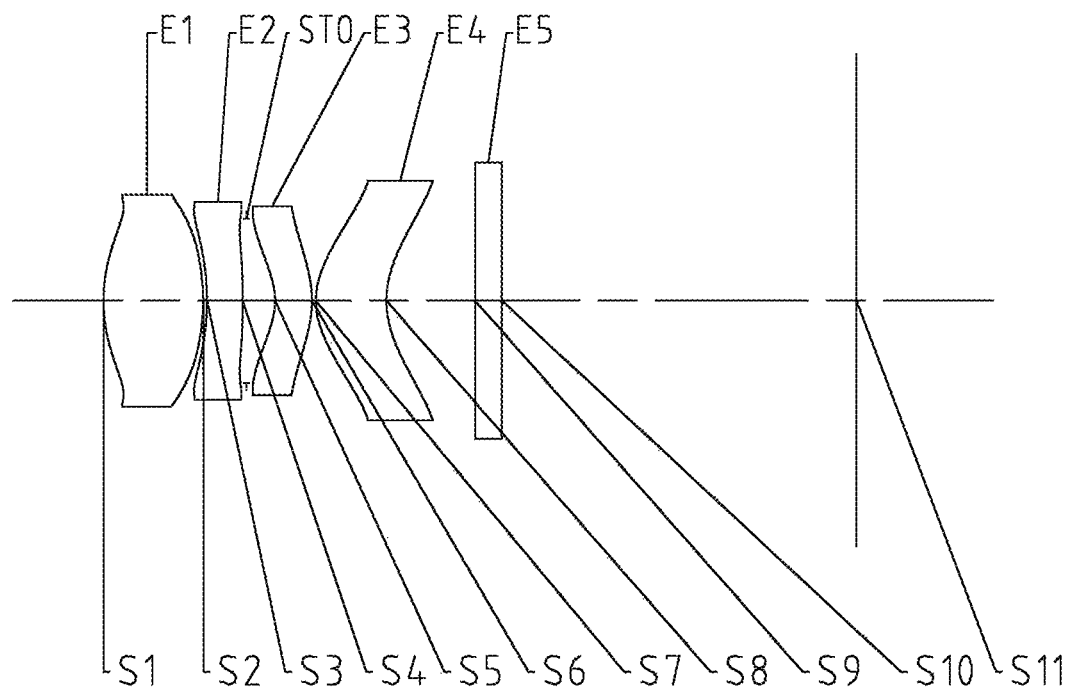
FIG. 15 is a schematic structural view of an optical imaging lens assembly according to embodiment 8 of the present disclosure.

An optical imaging lens assembly according to embodiment 8 of the present disclosure is described below with reference to FIG. 15 to FIG. 16D. FIG. 15 is a schematic structural view of the optical imaging lens assembly according to embodiment 8 of the present disclosure.

As shown in FIG. 15, the optical imaging lens assembly includes, sequentially from an object side to an image side along an optical axis: a first lens E1, a second lens E2, a stop STO, a third lens E3, a fourth lens E4, an optical filter E5 and an image plane S11.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a convex surface. The third lens E3 has negative refractive power, an object-side surface S5 thereof is concave surface, and an image-side surface S6 thereof is a convex surface. The fourth lens E4 has positive refractive power, an object-side surface S7 thereof is convex surface, and an image-side surface S8 thereof is a concave surface. The optical filter E5 has an object-side surface S9 and an image-side surface S10. Light from the object sequentially passes through the respective surfaces S1 to S10 and is finally imaged on the image plane S11.

In this embodiment, a total effective focal length f of the optical imaging lens assembly satisfies f=1.76 mm, and a distance TTL along the optical axis from the object-side surface S1 of the first lens E1 to the image plane S11 satisfies TTL=5.93mm.

Table 14 is a table showing the basic parameters of the optical imaging lens assembly of the embodiment 8, wherein the units for the radius of curvature, the thickness/distance and the focal length are millimeter (mm).

TABLE 14

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 2.4688 | | | | |
| S1 | aspheric | 1.2839 | 0.7860 | 1.54 | 56.1 | 1.38 | −5.8981 |
| S2 | aspheric | −1.4398 | 0.0300 | | | | −7.2355 |
| S3 | aspheric | −1.8658 | 0.2800 | 1.66 | 20.4 | −3.40 | −17.2114 |
| S4 | aspheric | −11.2227 | 0.0300 | | | | −82.1997 |
| STO | spherical | infinite | 0.2258 | | | | 0.0000 |
| S5 | aspheric | −0.5284 | 0.2900 | 1.66 | 20.4 | −2.66 | −5.3278 |
| S6 | aspheric | −0.9175 | 0.0300 | | | | −7.6711 |
| S7 | aspheric | 0.5596 | 0.5560 | 1.54 | 56.1 | 2.02 | −3.5931 |
| S8 | aspheric | 0.7358 | 0.6989 | | | | −1.7162 |
| S9 | spherical | infinite | 0.2100 | 1.52 | 64.2 | | |
| S10 | spherical | infinite | 2.7934 | | | | |
| S11 | spherical | infinite | | | | | |

In the embodiment 8, the object-side surface and the image-side surface of any one of the first lens E1 to the fourth lens E4 are aspheric. Table 15 below shows high-order coefficients $A_4$, $A_6$, $A_8$, $A_{10}$, $A_{12}$, $A_{14}$, $A_{16}$ and $A_{18}$ applicable to each aspheric surface S1-S8 in embodiment.

TABLE 15

| Surface number | A4 | A6 | A8 | A10 | A12 | A14 | A16 | A18 |
|---|---|---|---|---|---|---|---|---|
| S1 | 2.5863E−01 | −3.4361E−01 | −7.0717E−01 | 3.1851E+00 | −6.8448E+00 | 4.5494E+00 | | |
| S2 | 5.5187E−01 | −3.8917E+00 | 8.7584E+00 | −9.4786E+00 | 4.0313E+00 | 7.4306E−02 | | |
| S3 | 7.4444E−02 | −1.8975E+00 | 5.1715E+00 | −2.3454E+00 | −4.9471E+00 | 4.8943E+00 | | |
| S4 | −5.1466E−01 | 1.9198E+00 | −4.0834E+00 | 1.2217E+01 | −1.9795E+01 | 1.0624E+01 | | |
| S5 | −2.1968E−01 | 3.0234E+00 | −1.1097E+01 | 2.8743E+01 | −4.2513E+01 | 2.4901E+01 | | |
| S6 | −4.2346E−01 | 2.9039E+00 | −8.7190E+00 | 1.6732E+01 | −1.8248E+01 | 8.3072E+00 | | |
| S7 | 3.8011E−01 | −1.0529E+00 | 2.1884E+00 | −5.0681E+00 | 9.5645E+00 | −1.2014E+01 | 8.5363E+00 | −2.5626E+00 |
| S8 | −3.4124E−01 | 1.2911E+00 | −4.2240E+00 | 8.3728E+00 | −1.0425E+01 | 7.7117E+00 | −2.9004E+00 | 3.5830E−01 |

Figure 16A:
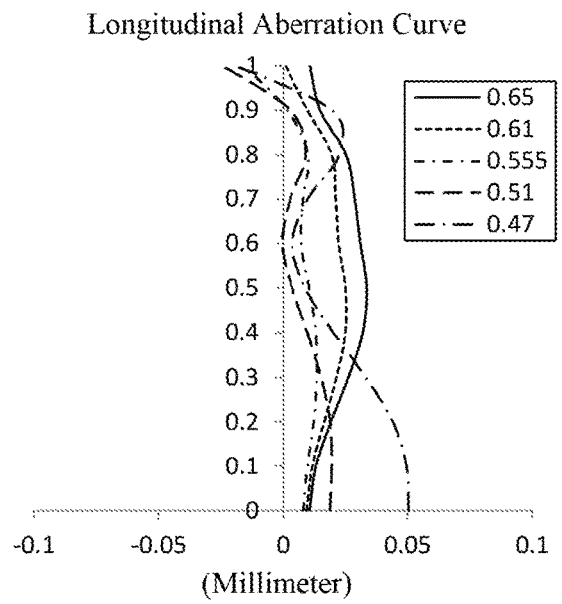
FIGS. 16A-16D illustrate a longitudinal aberration curve, an astigmatic curve, a distortion curve, a lateral color curve of the optical imaging lens assembly according to embodiment 8, respectively.
Figure 16B:
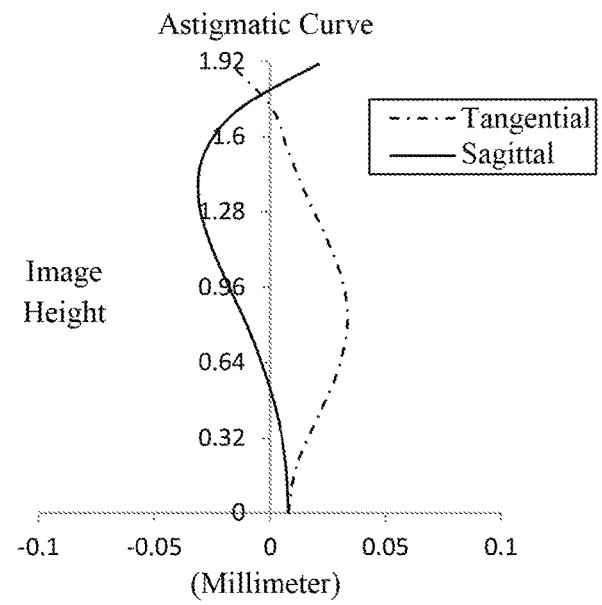
Figure 16C:
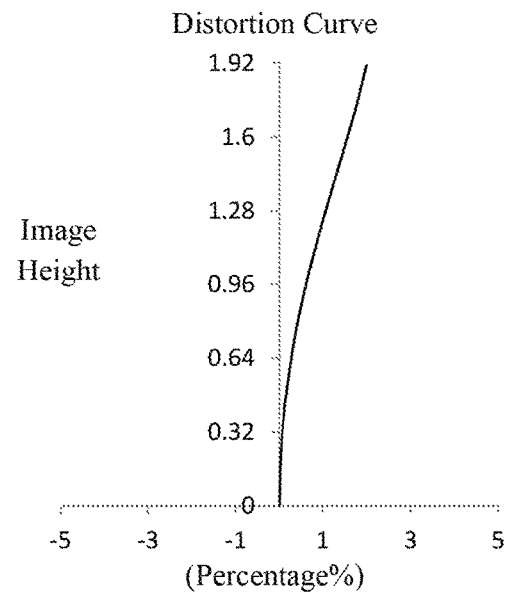
Figure 16D:
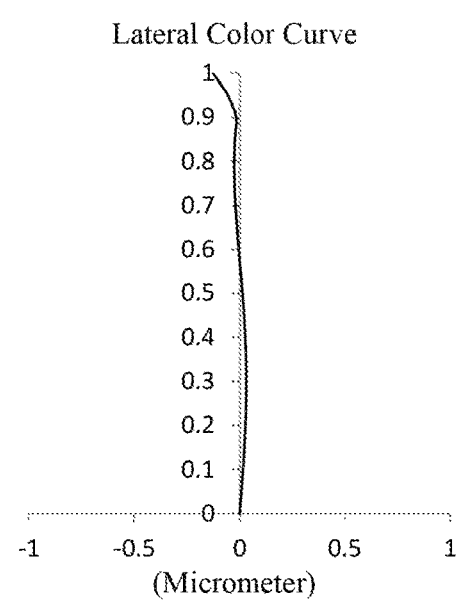

FIG. 16A illustrates a longitudinal aberration curve of the optical imaging lens assembly according to embodiment 8, representing deviations of focal points converged by light of different wavelengths after passing through the optical imaging lens assembly. FIG. 16B illustrates an astigmatic curve of the optical imaging lens assembly according to embodiment 8, representing a curvature of a tangential plane and a curvature of a sagittal plane. FIG. 16C illustrates a distortion curve of the optical imaging lens assembly according to embodiment 8, representing amounts of distortion corresponding to different image heights. FIG. 16D illustrates a lateral color curve of the optical imaging lens assembly according to embodiment 8, representing deviations of different image heights on an image plane after light passes through the optical imaging lens assembly. It can be seen from FIG. 16A to FIG. 16D that the optical imaging lens assembly provided in embodiment 8 can achieve good image quality.

Embodiment 9

Figure 17:
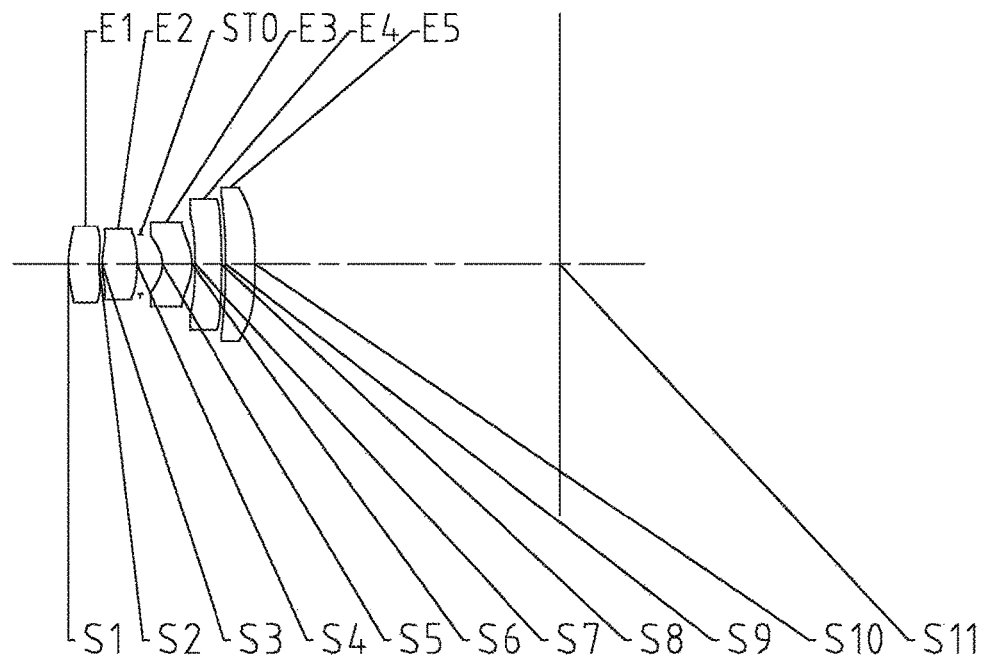
FIG. 17 is a schematic structural view of an optical imaging lens assembly according to embodiment 9 of the present disclosure.

An optical imaging lens assembly according to embodiment 9 of the present disclosure is described below with reference to FIG. 17 to FIG. 18D. FIG. 17 is a schematic structural view of the optical imaging lens assembly according to embodiment 9 of the present disclosure.

As shown in FIG. 17, the optical imaging lens assembly includes, sequentially from an object side to an image side along an optical axis: a stop STO, a first lens E1, a second lens E2, a third lens E3, a fourth lens E4, a fifth lens E5, and an image plane S11.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is concave surface, and an image-side surface S6 thereof is a convex surface. The fourth lens E4 has negative refractive power, an object-side surface S7 thereof is concave surface, and an image-side surface S8 thereof is a convex surface. The fifth lens E5 has negative refractive power, an object-side surface S9 thereof is concave surface, and an image-side surface S10 thereof is a convex surface. Light from the object sequentially passes through the respective surfaces S1 to S10 and is finally imaged on the image plane S11.

In this embodiment, a total effective focal length f of the optical imaging lens assembly satisfies f=1.45 mm, and a distance TTL along the optical axis from the object-side surface S1 of the first lens E1 to the image plane S11 satisfies TTL=3.82 mm.

Table 16 is a table showing the basic parameters of the optical imaging lens assembly of the embodiment 9, wherein the units for the radius of curvature, the thickness/distance and the focal length are millimeter (mm).

TABLE 16

| Surface number | Surface type | Radius of curvature | Thickness/ distance | Material Refractive index | Material Abbe number | Focal length | Conic coefficient |
|---|---|---|---|---|---|---|---|
| OBJ | spherical | infinite | 2.3600 | | | | |
| S1 | aspheric | 0.8443 | 0.2364 | 1.54 | 56.0 | 17.80 | −5.4531 |
| S2 | aspheric | 0.8351 | 0.0250 | | | | 1.0170 |
| S3 | aspheric | 0.5393 | 0.2699 | 1.54 | 56.0 | 0.74 | −9.8550 |
| S4 | aspheric | −1.2481 | 0.0250 | | | | 19.3470 |
| STO | spherical | infinite | 0.1709 | | | | |
| S5 | aspheric | −0.2435 | 0.2293 | 1.67 | 20.0 | −1.99 | −0.3412 |
| S6 | aspheric | −0.4104 | 0.0250 | | | | −14.0617 |
| S7 | aspheric | −3.5426 | 0.2100 | 1.67 | 20.0 | −19.95 | 61.2396 |
| S8 | aspheric | −4.9240 | 0.0319 | | | | 7.0632 |
| S9 | aspheric | −5.3758 | 0.2275 | 1.64 | 22.2 | −86.10 | 23.2508 |
| S10 | aspheric | −6.0488 | 2.3646 | | | | 89.4672 |
| S11 | spherical | infinite | | | | | |

In the embodiment 9, the object-side surface and the image-side surface of any one of the first lens E1 to the fifth lens E5 are aspheric. Table 17 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 in embodiment.

TABLE 17

| Surface number | A4 | A6 | A8 | A10 | A12 |
|---|---|---|---|---|---|
| S1 | −6.5122E−01 | 4.3265E+01 | −2.8566E+03 | 1.0118E+05 | −2.2828E+06 |
| S2 | −1.5682E+01 | 2.1787E+02 | −6.4489E+03 | 1.7928E+05 | −3.4959E+06 |
| S3 | −7.2375E+00 | 1.6024E+02 | −1.1253E+04 | 4.8559E+05 | −1.3136E+07 |
| S4 | −1.0175E+00 | −9.0767E+01 | 8.3427E+03 | −4.9451E+05 | 1.8436E+07 |
| S5 | 7.3133E+00 | 3.9442E+02 | −3.9898E+04 | 2.8390E+06 | −1.2273E+08 |
| S6 | −2.1613E+01 | 8.0492E+02 | −2.2444E+04 | 4.7759E+05 | −7.0397E+06 |
| S7 | −2.8979E+00 | 9.6730E+01 | −2.6505E+03 | 5.0354E+04 | −6.1504E+05 |
| S8 | 5.1296E−01 | −1.8025E+01 | 1.4788E+02 | 5.1207E+02 | −1.4598E+04 |
| S9 | 1.0346E+00 | −3.1919E+01 | 3.3620E+02 | −1.7931E+03 | 5.2544E+03 |
| S10 | −9.5360E−01 | −1.2360E+00 | 2.7590E+01 | −2.0155E+02 | 9.5698E+02 |

| Surface number | A14 | A16 | A18 | A20 |
|---|---|---|---|---|
| S1 | 3.2587E+07 | −2.8592E+08 | 1.4069E+09 | −2.9739E+09 |
| S2 | 4.4683E+07 | −3.5640E+08 | 1.6068E+09 | −3.1256E+09 |
| S3 | 2.2499E+08 | −2.3692E+09 | 1.3988E+10 | −3.5453E+10 |
| S4 | −4.2531E+08 | 5.9460E+09 | −4.6192E+10 | 1.5382E+11 |
| S5 | 3.2922E+09 | −5.3418E+10 | 4.8001E+11 | −1.8322E+12 |
| S6 | 6.8974E+07 | −4.2656E+08 | 1.4996E+09 | −2.2757E+09 |
| S7 | 4.7248E+06 | −2.2042E+07 | 5.6876E+07 | −6.2410E+07 |
| S8 | 9.6429E+04 | −3.1827E+05 | 5.3872E+05 | −3.7507E+05 |
| S9 | −7.4415E+03 | 1.1525E+03 | 5.8843E+03 | 2.2881E+02 |
| S10 | −3.1086E+03 | 6.8340E+03 | −9.0276E+03 | 5.4206E+03 |

Figures 18A, 18B:
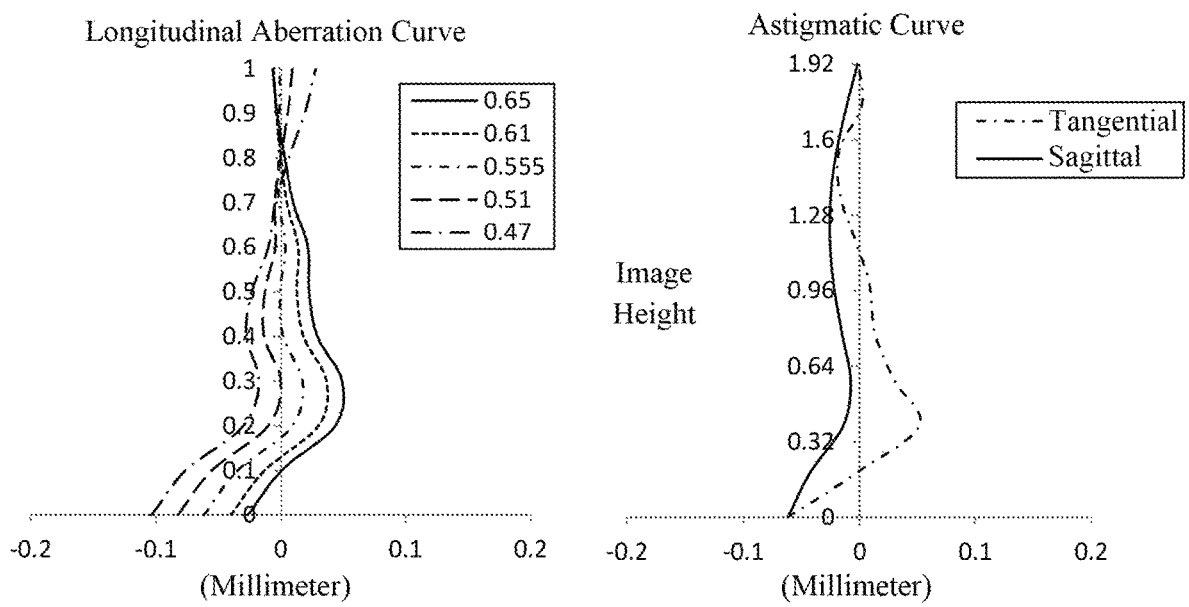

FIG. 18A illustrates a longitudinal aberration curve of the optical imaging lens assembly according to embodiment 9, representing deviations of focal points converged by light of different wavelengths after passing through the optical imaging lens assembly. FIG. 18B illustrates an astigmatic curve of the optical imaging lens assembly according to embodiment 9, representing a curvature of a tangential plane and a curvature of a sagittal plane. FIG. 18C illustrates a distortion curve of the optical imaging lens assembly according to embodiment 9, representing amounts of distortion corresponding to different image heights. FIG. 18D illustrates a lateral color curve of the optical imaging lens assembly according to embodiment 9, representing deviations of different image heights on an image plane after light passes through the optical imaging lens assembly. It can be seen from FIG. 18A to FIG. 18D that the optical imaging lens assembly provided in embodiment 9 can achieve good image quality.

Embodiment 10

An optical imaging lens assembly according to embodiment 10 of the present disclosure is described below with reference to FIG. 19 to FIG. 20D. FIG. 19 is a schematic structural view of the optical imaging lens assembly according to embodiment 10 of the present disclosure.

As shown in FIG. 19, the optical imaging lens assembly includes, sequentially from an object side to an image side along an optical axis: a first lens E1, a second lens E2, a stop STO, a third lens E3, a fourth lens E4, a fifth lens E5, and an image plane S11.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is concave surface, and an image-side surface S6 thereof is a convex surface. The fourth lens E4 has positive refractive power, an object-side surface S7 thereof is concave surface, and an image-side surface S8 thereof is a convex surface. The fifth lens E5 has negative refractive power, an object-side surface S9 thereof is concave surface, and an image-side surface S10 thereof is a convex surface. Light from the object sequentially passes through the respective surfaces S1 to S10 and is finally imaged on the image plane S11.

In this embodiment, a total effective focal length f of the optical imaging lens assembly satisfies f=1.46 mm, and a distance TTL along the optical axis from the object-side surface S1 of the first lens E1 to the image plane S11 satisfies TTL=3.73 mm.

Table 18 is a table showing the basic parameters of the optical imaging lens assembly of the embodiment 10, wherein the units for the radius of curvature, the thickness/distance and the focal length are millimeter (mm).

TABLE 18

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 2.5000 | | | | 0.0000 |
| S1 | aspheric | 0.8543 | 0.2100 | 1.54 | 56.0 | 29.80 | −6.1567 |
| S2 | aspheric | 0.8247 | 0.0250 | | | | 1.3279 |
| S3 | aspheric | 0.5385 | 0.2614 | 1.54 | 56.0 | 0.74 | −9.9950 |
| S4 | aspheric | −1.2688 | 0.0250 | | | | 19.7517 |
| STO | spherical | infinite | 0.1829 | | | | |

TABLE 18-continued

| Surface number | Surface type | Radius of curvature | Thickness/ distance | Material Refractive index | Abbe number | Focal length | Conic coefficient |
|---|---|---|---|---|---|---|---|
| S5 | aspheric | −0.2545 | 0.2311 | 1.67 | 20.0 | −1.65 | −0.3154 |
| S6 | aspheric | −0.4506 | 0.0250 | | | | −18.1635 |
| S7 | aspheric | −4.7099 | 0.2130 | 1.67 | 20.0 | 12.88 | 63.0999 |
| S8 | aspheric | −3.1092 | 0.0377 | | | | −99.0000 |
| S9 | aspheric | −3.2573 | 0.2100 | 1.63 | 23.0 | −11.93 | −17.5140 |
| S10 | aspheric | −5.8455 | 2.3087 | | | | 85.8320 |
| S11 | spherical | infinite | | | | | |

In the embodiment 10, the object-side surface and the image-side surface of any one of the first lens E1 to the fifth lens E5 are aspheric. Table 19 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 in embodiment 10.

TABLE 19

| Surface number | A4 | A6 | A8 | A10 | A12 |
|---|---|---|---|---|---|
| S1 | −7.7668E−01 | 5.7246E+01 | −4.1932E+03 | 1.6596E+05 | −4.0954E+06 |
| S2 | −1.6529E+01 | 2.6273E+02 | −7.5464E+03 | 1.8156E+05 | −2.4411E+06 |
| S3 | −8.6968E+00 | 3.4982E+02 | −2.7456E+04 | 1.3652E+06 | −4.2772E+07 |
| S4 | −1.1485E+00 | −1.5851E+02 | 1.7598E+04 | −1.1725E+06 | 4.8234E+07 |
| S5 | 5.2164E+00 | 6.8440E+02 | −7.9602E+04 | 6.1854E+06 | −2.9679E+08 |
| S6 | −2.3209E+01 | 8.7965E+02 | −2.4379E+04 | 5.2002E+05 | −7.7124E+06 |
| S7 | −4.4430E+00 | 1.2781E+02 | −2.8595E+03 | 4.9226E+04 | −5.7959E+05 |
| S8 | 1.6893E+00 | −5.9991E+01 | 8.8856E+02 | −6.8097E+03 | 3.1093E+04 |
| S9 | 1.9527E+00 | −6.6960E+01 | 8.6708E+02 | −6.4095E+03 | 3.1288E+04 |
| S10 | −1.0756E+00 | −4.4745E+00 | 7.1193E+01 | −5.6343E+02 | 3.0094E+03 |

| Surface number | A14 | A16 | A18 | A20 |
|---|---|---|---|---|
| S1 | 6.3243E+07 | −5.9535E+08 | 3.1246E+09 | −7.0115E+09 |
| S2 | 6.7360E+06 | 2.5823E+08 | −3.3043E+09 | 1.2559E+10 |
| S3 | 8.4819E+08 | −1.0335E+10 | 7.0600E+10 | −2.0697E+11 |
| S4 | −1.2277E+09 | 1.8891E+10 | −1.6101E+11 | 5.8424E+11 |
| S5 | 8.8840E+09 | −1.6143E+11 | 1.6285E+12 | −6.9947E+12 |
| S6 | 7.5568E+07 | −4.6110E+08 | 1.5700E+09 | −2.2526E+09 |
| S7 | 4.3274E+06 | −1.9258E+07 | 4.5877E+07 | −4.4077E+07 |
| S8 | −8.8649E+04 | 1.5285E+05 | −1.3706E+05 | 3.5574E+04 |
| S9 | −1.0298E+05 | 2.1588E+05 | −2.5225E+05 | 1.1826E+05 |
| S10 | −1.1171E+04 | 2.7540E+04 | −4.0092E+04 | 2.5934E+04 |

Figure 20A:
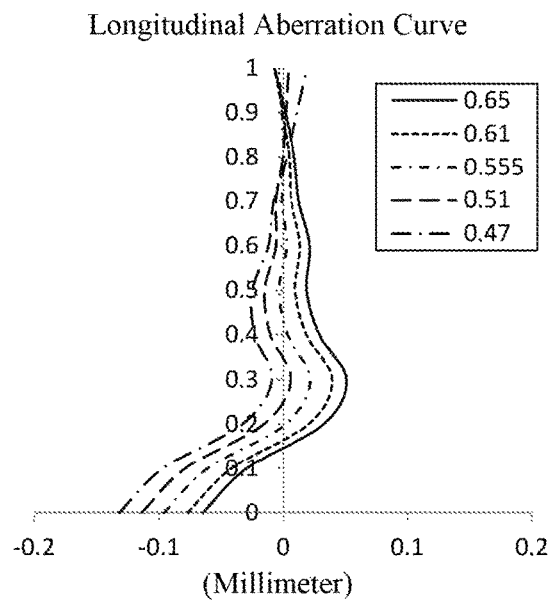
FIGS. 20A-20D illustrate a longitudinal aberration curve, an astigmatic curve, a distortion curve, a lateral color curve of the optical imaging lens assembly according to embodiment 10, respectively.
Figure 20B:
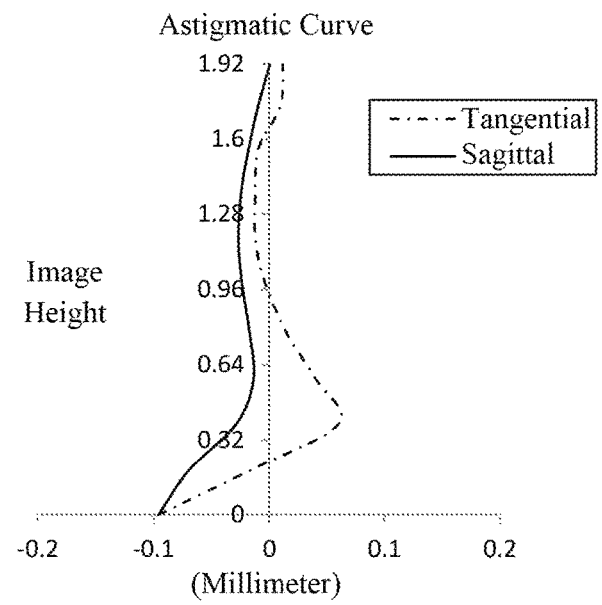
Figure 20C:
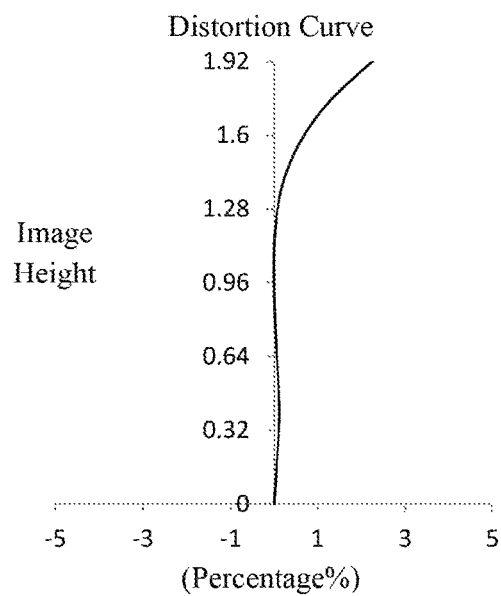
Figure 20D:
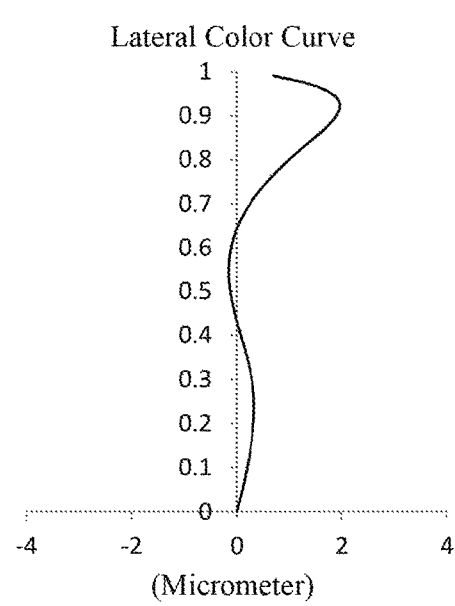

FIG. 20A illustrates a longitudinal aberration curve of the optical imaging lens assembly according to embodiment 10, representing deviations of focal points converged by light of different wavelengths after passing through the optical imaging lens assembly. FIG. 20B illustrates an astigmatic curve of the optical imaging lens assembly according to embodiment 10, representing a curvature of a tangential plane and a curvature of a sagittal plane. FIG. 20C illustrates a distortion curve of the optical imaging lens assembly according to embodiment 10, representing amounts of distortion corresponding to different image heights. FIG. 20D illustrates a lateral color curve of the optical imaging lens assembly according to embodiment 10, representing deviations of different image heights on an image plane after light passes through the optical imaging lens assembly. It can be seen from FIG. 20A to FIG. 20D that the optical imaging lens assembly provided in embodiment 10 can achieve good image quality.

Embodiment 11

An optical imaging lens assembly according to embodiment 11 of the present disclosure is described below with reference to FIG. 21 to FIG. 22D. FIG. 21 is a schematic structural view of the optical imaging lens assembly according to embodiment 11 of the present disclosure.

As shown in FIG. 21, the optical imaging lens assembly includes, sequentially from an object side to an image side along an optical axis: a first lens E1, a second lens E2, a third lens E3, a stop STO, a fourth lens E4, a fifth lens E5, a sixth lens E6 and an image plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is convex surface, and an image-side surface S6 thereof is a convex surface. The fourth lens E4 has negative refractive power, an object-side surface S7 thereof is concave surface, and an image-side surface S8 thereof is a convex surface. The fifth lens E5 has negative refractive power, an object-side surface S9 thereof is concave surface, and an image-side surface S10 thereof is a convex surface. The sixth lens E6 has negative refractive power, an object-side surface S11 thereof is a convex surface, and an image-side surface S12 thereof is a concave surface. Light from the object sequentially passes through the respective surfaces S1 to S12 and is finally imaged on the image plane S13.

In this embodiment, a total effective focal length f of the optical imaging lens assembly satisfies f=1.50 mm, and a distance TTL along the optical axis from the object-side surface S1 of the first lens E1 to the image plane S13 satisfies TTL=3.73 mm.

Table 20 is a table showing the basic parameters of the optical imaging lens assembly of the embodiment 11, wherein the units for the radius of curvature, the thickness/distance and the focal length are millimeter (mm).

TABLE 20

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 2.9000 | | | | |
| S1 | aspheric | 0.9003 | 0.2000 | 1.55 | 45.0 | 20.71 | −4.7796 |
| S2 | aspheric | 0.9003 | 0.0250 | | | | 1.6533 |
| S3 | aspheric | 0.7029 | 0.1500 | 1.60 | 29.4 | −2.89 | −15.2614 |
| S4 | aspheric | 0.4602 | 0.0250 | | | | −2.1981 |
| S5 | aspheric | 0.4330 | 0.2125 | 1.54 | 56.0 | 0.66 | −0.7255 |
| S6 | aspheric | −1.5858 | 0.0250 | | | | 9.8317 |
| STO | spherical | infinite | 0.3123 | | | | |
| S7 | aspheric | −0.3028 | 0.2005 | 1.67 | 20.0 | −3.08 | −0.2158 |
| S8 | aspheric | −0.4491 | 0.0250 | | | | −13.2647 |
| S9 | aspheric | −2.9630 | 0.2000 | 1.54 | 56.0 | −7.20 | 50.6580 |
| S10 | aspheric | −12.8535 | 0.0250 | | | | 99.0000 |
| S11 | aspheric | 19.7700 | 0.2390 | 1.56 | 37.8 | −10.85 | −99.0000 |
| S12 | aspheric | 4.6610 | 2.0869 | | | | 37.4004 |
| S13 | spherical | infinite | | | | | |

In the embodiment 11, the object-side surface and the image-side surface of any one of the first lens E1 to the sixth lens E6 are aspheric. Table 21 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S12 in embodiment.

TABLE 21

| Surface number | A4 | A6 | A8 | A10 | A12 |
|---|---|---|---|---|---|
| S1 | −2.6996E−01 | 3.2046E+00 | −3.3346E+02 | 8.7554E+03 | −1.4769E+05 |
| S2 | −1.1287E+01 | 1.0136E+01 | 9.1553E+02 | −9.2357E+03 | −2.1693E+03 |
| S3 | −5.5181E+00 | −6.3328E+01 | 1.1852E+03 | 1.7564E+04 | −7.0888E+05 |
| S4 | −1.5321E+00 | 2.8125E+00 | −1.3244E+03 | 9.0840E+04 | −2.4471E+06 |
| S5 | −1.4537E+00 | 7.1130E+01 | −5.0177E+03 | 2.0665E+05 | −4.9486E+06 |
| S6 | 6.6478E−01 | −4.3615E+01 | 3.0037E+03 | −1.1560E+05 | 2.7161E+06 |
| S7 | 6.7643E+00 | 3.0778E+01 | 5.5325E+02 | −7.0357E+04 | 2.7083E+06 |
| S8 | −2.5032E+01 | 7.4451E+02 | −1.6433E+04 | 2.6634E+05 | −3.0502E+06 |
| S9 | −1.7908E+01 | 4.3124E+02 | −8.6567E+03 | 1.2001E+05 | −1.1525E+06 |
| S10 | 4.6093E−01 | −6.7201E+01 | 1.1398E+03 | −9.8268E+03 | 5.1622E+04 |
| S11 | 2.5744E+00 | −8.5183E+01 | 1.1497E+03 | −8.8422E+03 | 4.2637E+04 |
| S12 | −1.4686E+00 | 7.9561E−01 | 1.0512E+01 | −3.6333E+01 | −3.6504E+01 |

| Surface number | A14 | A16 | A18 | A20 |
|---|---|---|---|---|
| S1 | 1.5196E+06 | −9.4282E+06 | 3.2314E+07 | −4.6853E+07 |
| S2 | 7.0728E+05 | −6.0580E+06 | 2.2890E+07 | −3.4460E+07 |
| S3 | 9.6430E+06 | −6.9998E+07 | 2.7147E+08 | −4.4416E+08 |
| S4 | 3.5994E+07 | −3.0618E+08 | 1.4236E+09 | −2.8234E+09 |
| S5 | 7.2022E+07 | −6.3301E+08 | 3.1056E+09 | −6.5828E+09 |
| S6 | −3.9734E+07 | 3.5191E+08 | −1.7259E+09 | 3.5679E+09 |
| S7 | −5.5210E+07 | 6.4203E+08 | −3.9854E+09 | 1.0228E+10 |
| S8 | 2.3751E+07 | −1.1888E+08 | 3.4462E+08 | −4.3628E+08 |
| S9 | 7.5376E+06 | −3.3137E+07 | 9.2232E+07 | −1.1939E+08 |
| S10 | −1.7521E+05 | 3.7979E+05 | −4.7807E+05 | 2.6373E+05 |
| S11 | −1.3221E+05 | 2.5578E+05 | −2.7990E+05 | 1.3178E+05 |
| S12 | 5.1193E+02 | −1.4433E+03 | 1.8045E+03 | −8.4243E+02 |

Figure 22C:
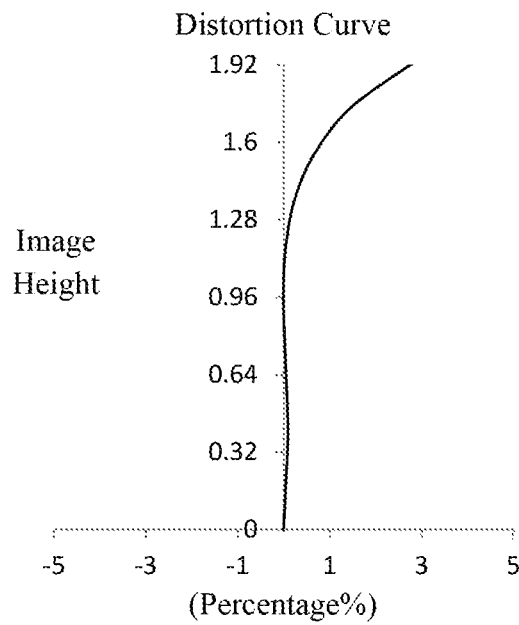
Figure 22D:
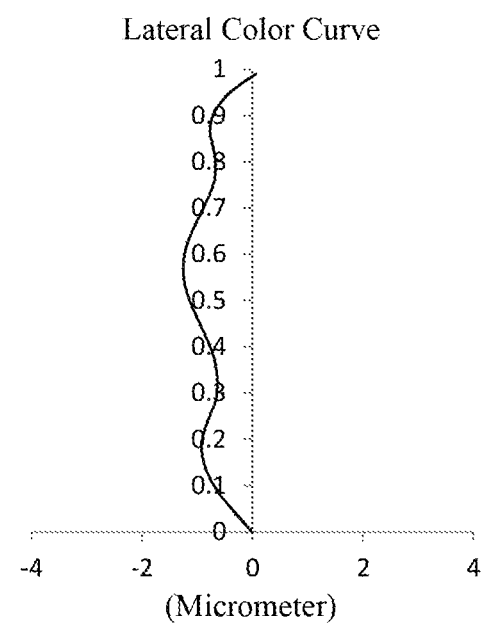

FIG. 22A illustrates a longitudinal aberration curve of the optical imaging lens assembly according to embodiment 11, representing deviations of focal points converged by light of different wavelengths after passing through the optical imaging lens assembly. FIG. 22B illustrates an astigmatic curve of the optical imaging lens assembly according to embodiment 11, representing a curvature of a tangential plane and a curvature of a sagittal plane. FIG. 22C illustrates a distortion curve of the optical imaging lens assembly according to embodiment 11, representing amounts of distortion corresponding to different image heights. FIG. 22D illustrates a lateral color curve of the optical imaging lens assembly according to embodiment 11, representing deviations of different image heights on an image plane after light passes through the optical imaging lens assembly. It can be seen from FIG. 22A to FIG. 22D that the optical imaging lens assembly provided in embodiment 11 can achieve good image quality.

Embodiment 12

Figure 23:
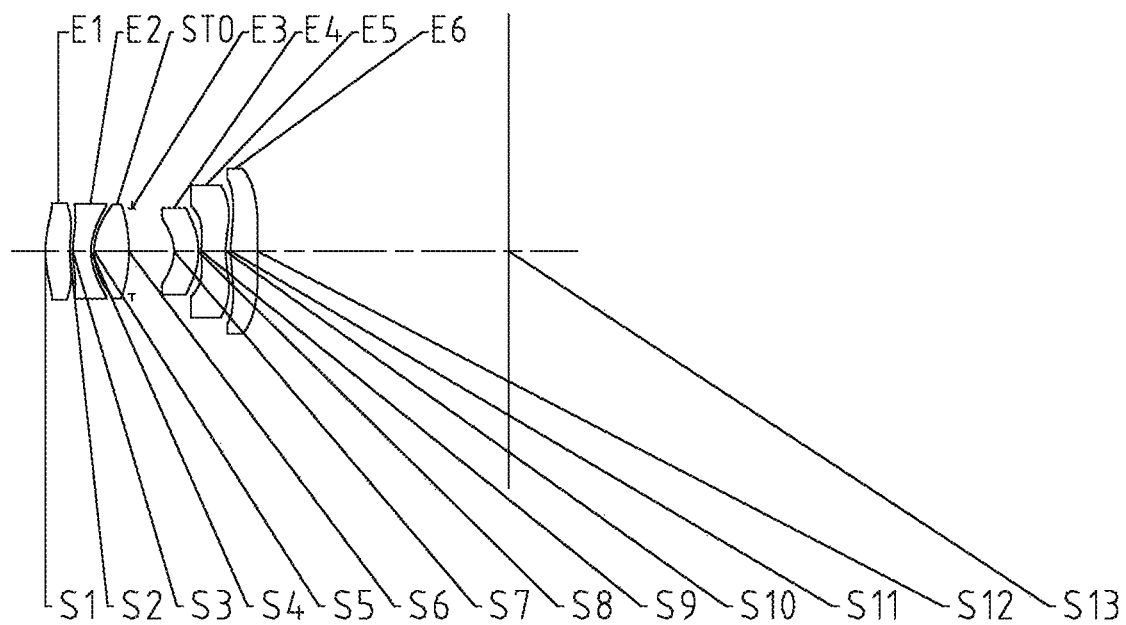
FIG. 23 is a schematic structural view of an optical imaging lens assembly according to embodiment 12 of the present disclosure.

An optical imaging lens assembly according to embodiment 12 of the present disclosure is described below with reference to FIG. 23 to FIG. 24D. FIG. 23 is a schematic structural view of the optical imaging lens assembly according to embodiment 12 of the present disclosure.

As shown in FIG. 23, the optical imaging lens assembly includes, sequentially from an object side to an image side along an optical axis: a first lens E1, a second lens E2, a third lens E3, a stop STO, a fourth lens E4, a fifth lens E5, a sixth lens E6 and an image plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is convex surface, and an image-side surface S6 thereof is a convex surface. The fourth lens E4 has negative refractive power, an object-side surface S7 thereof is concave surface, and an image-side surface S8 thereof is a convex surface. The fifth lens E5 has negative refractive power, an object-side surface S9 thereof is convex surface, and an image-side surface S10 thereof is a concave surface. The sixth lens E6 has positive refractive power, an object-side surface S11 thereof is a convex surface, and an image-side surface S12 thereof is a concave surface. Light from the object sequentially passes through the respective surfaces S1 to S12 and is finally imaged on the image plane S13.

In this embodiment, a total effective focal length f of the optical imaging lens assembly satisfies f=1.50 mm, and a distance TTL along the optical axis from the object-side surface S1 of the first lens E1 to the image plane S13 satisfies TTL=3.82 mm.

Table 22 is a table showing the basic parameters of the optical imaging lens assembly of the embodiment 12, wherein the units for the radius of curvature, the thickness/distance and the focal length are millimeter (mm).

TABLE 22

| Surface number | Surface type | Radius of curvature | Thickness/ distance | Material Refractive index | Material Abbe number | Focal length | Conic coefficient |
|---|---|---|---|---|---|---|---|
| OBJ | spherical | infinite | 2.9000 | | | | |
| S1 | aspheric | 0.9195 | 0.2000 | 1.58 | 30.5 | 41.78 | −4.3544 |
| S2 | aspheric | 0.8788 | 0.0250 | | | | 1.9270 |
| S3 | aspheric | 0.6954 | 0.1500 | 1.63 | 24.1 | −2.50 | −10.8922 |
| S4 | aspheric | 0.4427 | 0.0250 | | | | −2.3666 |
| S5 | aspheric | 0.4275 | 0.2865 | 1.54 | 56.0 | 0.65 | −1.2323 |
| S6 | aspheric | −1.4413 | 0.0250 | | | | 9.5834 |
| STO | spherical | infinite | 0.3476 | | | | 0.0000 |
| S7 | aspheric | −0.3210 | 0.2000 | 1.65 | 21.5 | −1.04 | −0.1793 |
| S8 | aspheric | −0.7549 | 0.0250 | | | | −23.6413 |
| S9 | aspheric | 1.0717 | 0.2000 | 1.54 | 56.0 | −5.67 | −29.5381 |
| S10 | aspheric | 0.7414 | 0.0410 | | | | −10.5193 |
| S11 | aspheric | 1.0048 | 0.2206 | 1.67 | 20.0 | 2.01 | −43.6792 |
| S12 | aspheric | 3.5183 | 2.0710 | | | | 23.0099 |
| S13 | spherical | infinite | | | | | |

In the embodiment 12, the object-side surface and the image-side surface of any one of the first lens E1 to the sixth lens E6 are aspheric. Table 23 below shows high-order coefficients $A_4$, $A_6$, $A_8$, $A_{10}$, $A_{12}$, $A_{14}$, $A_{16}$, $A_{18}$ and Am applicable to each aspheric surface S1-S12 in embodiment.

TABLE 23

| Surface number | A4 | A6 | A8 | A10 | A12 |
|---|---|---|---|---|---|
| S1 | −3.0616E−01 | −7.1679E−01 | −4.7569E+01 | 7.7393E+02 | −1.0050E+04 |
| S2 | −8.7266E+00 | 9.7672E+00 | 2.9645E+02 | 1.8172E+02 | −5.4595E+04 |
| S3 | −3.8149E+00 | −3.1509E+01 | 4.3522E+02 | 7.6989E+03 | −2.0749E+05 |
| S4 | −1.7264E+00 | 2.4595E+01 | −8.6033E+02 | 3.1045E+04 | −5.7825E+05 |
| S5 | −2.6235E+00 | 4.7573E+01 | −1.3334E+03 | 3.5374E+04 | −5.8741E+05 |
| S6 | −1.0282E−01 | −4.0256E+00 | 2.2353E+02 | −5.5293E+03 | 9.2194E+04 |
| S7 | 5.9983E+00 | 8.4255E+01 | −6.3395E+03 | 2.9941E+05 | −8.5353E+06 |
| S8 | −1.6681E+01 | 4.1550E+02 | −9.4179E+03 | 1.7498E+05 | −2.3429E+06 |
| S9 | −1.3861E+01 | 2.4555E+02 | −5.9150E+03 | 1.1149E+05 | −1.4450E+06 |

TABLE 23-continued

| | | | | |
|---|---|---|---|---|
| S10 | −4.2370E−01 | −9.9529E+01 | 1.8116E+03 | −1.7264E+04 | 9.9567E+04 |
| S11 | 1.8655E+00 | −9.8874E+01 | 1.4970E+03 | −1.2692E+04 | 6.6731E+04 |
| S12 | −2.1731E+00 | 4.6685E+00 | 2.1227E+01 | −2.3851E+02 | 9.7340E+02 |

| Surface number | A14 | A16 | A18 | A20 |
|---|---|---|---|---|
| S1 | 7.9058E+04 | −3.6031E+05 | 8.5944E+05 | −8.0036E+05 |
| S2 | 6.1977E+05 | −3.3367E+06 | 9.2089E+06 | −1.0509E+07 |
| S3 | 2.0625E+06 | −1.0956E+07 | 3.0962E+07 | −3.6736E+07 |
| S4 | 6.0293E+06 | −3.6280E+07 | 1.1819E+08 | −1.6186E+08 |
| S5 | 5.9154E+06 | −3.5604E+07 | 1.1856E+08 | −1.6925E+08 |
| S6 | −9.5308E+05 | 5.9265E+06 | −2.0069E+07 | 2.7669E+07 |
| S7 | 1.5293E+08 | −1.6781E+09 | 1.0315E+10 | −2.7179E+10 |
| S8 | 2.1126E+07 | −1.2050E+08 | 3.9135E+08 | −5.4986E+08 |
| S9 | 1.2040E+07 | −6.1143E+07 | 1.7104E+08 | −1.9917E+08 |
| S10 | −3.5983E+05 | 8.0260E+05 | −1.0198E+06 | 5.7081E+05 |
| S11 | −2.2311E+05 | 4.6392E+05 | −5.4982E+05 | 2.8484E+05 |
| S12 | −2.2304E+03 | 2.9789E+03 | −2.1733E+03 | 6.4956E+02 |

Figure 24A:
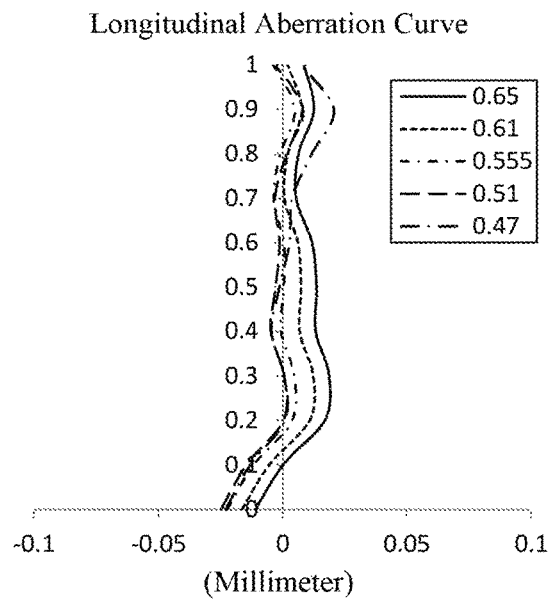
FIGS. 24A-24D illustrate a longitudinal aberration curve, an astigmatic curve, a distortion curve, a lateral color curve of the optical imaging lens assembly according to embodiment 12, respectively.
Figure 24B:
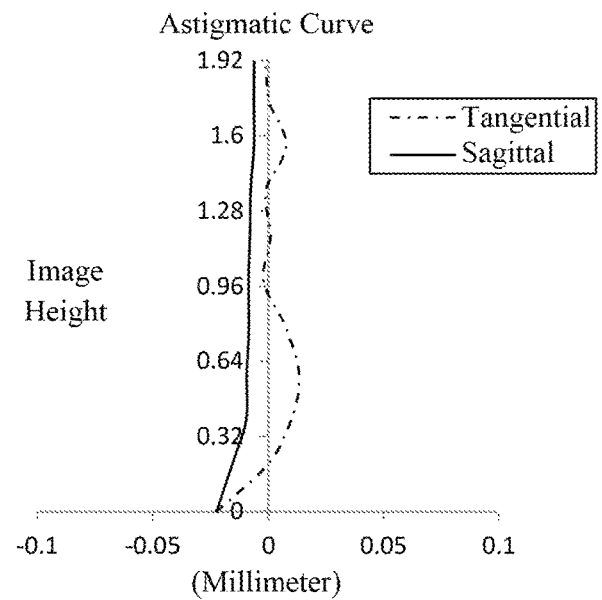
Figure 24C:
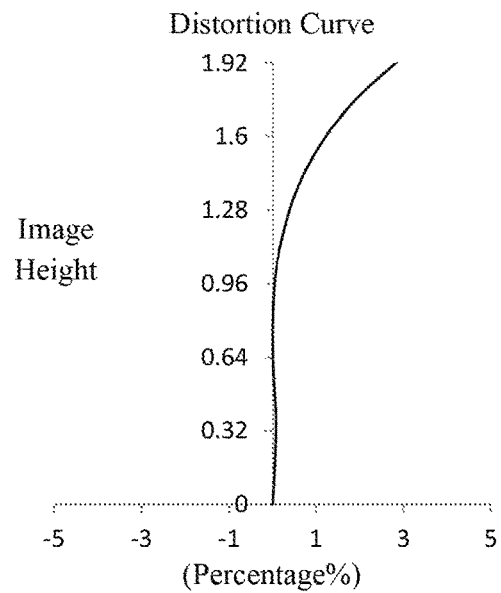
Figure 24D:
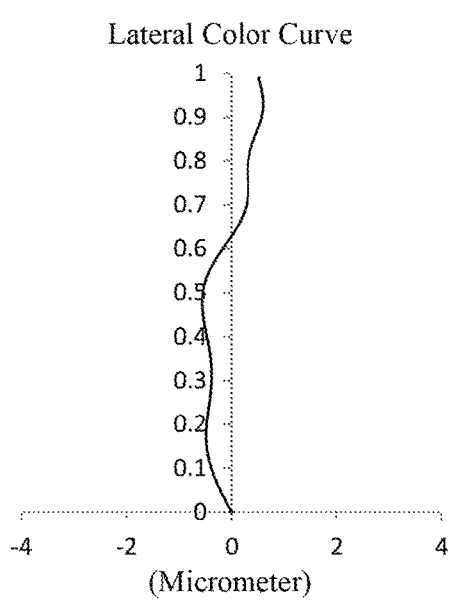

FIG. 24A illustrates a longitudinal aberration curve of the optical imaging lens assembly according to embodiment 12, representing deviations of focal points converged by light of different wavelengths after passing through the optical imaging lens assembly. FIG. 24B illustrates an astigmatic curve of the optical imaging lens assembly according to embodiment 12, representing a curvature of a tangential plane and a curvature of a sagittal plane. FIG. 24C illustrates a distortion curve of the optical imaging lens assembly according to embodiment 12, representing amounts of distortion corresponding to different image heights. FIG. 24D illustrates a lateral color curve of the optical imaging lens assembly according to embodiment 12, representing deviations of different image heights on an image plane after light passes through the optical imaging lens assembly. It can be seen from FIG. 24A to FIG. 24D that the optical imaging lens assembly provided in embodiment 12 can achieve good image quality.

Based on the above, embodiments 1 to 12 respectively satisfy the relationship shown in Table 24.

TABLE 24

| Formula | Embodiment | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| ImgH/(To*Tan(FOV/2)) | 2.26 | 2.06 | 2.01 | 1.57 | 1.80 | 1.80 | 1.77 | 1.80 | 1.38 | 1.30 | 1.27 | 1.33 |
| Fno1 | 12.00 | 9.00 | 9.50 | 7.00 | 5.50 | 3.70 | 16.00 | 3.70 | 5.90 | 6.50 | 5.65 | 4.88 |
| Fno2 | 2.94 | 2.73 | 2.92 | 2.39 | 1.82 | 1.02 | 5.73 | 1.01 | 2.25 | 2.58 | 1.98 | 1.58 |
| TTL/To | 2.18 | 2.22 | 2.15 | 1.85 | 2.91 | 2.51 | 3.05 | 2.40 | 1.62 | 1.49 | 1.28 | 1.32 |
| f*tan(FOV/2)/ImgH | 0.23 | 0.29 | 0.30 | 0.33 | 0.32 | 0.28 | 0.35 | 0.28 | 0.37 | 0.38 | 0.34 | 0.32 |
| Sd/Td | 0.66 | 0.67 | 0.68 | 0.55 | 0.49 | 0.52 | 0.45 | 0.49 | 0.62 | 0.63 | 0.61 | 0.59 |
| ΣCT/TTL | 0.25 | 0.19 | 0.19 | 0.27 | 0.29 | 0.33 | 0.26 | 0.32 | 0.31 | 0.30 | 0.32 | 0.33 |
| ΣAT/Td | 0.09 | 0.19 | 0.21 | 0.18 | 0.15 | 0.17 | 0.12 | 0.14 | 0.19 | 0.21 | 0.27 | 0.28 |
| BFL/TTL | 0.72 | 0.76 | 0.76 | 0.76 | 0.66 | 0.60 | 0.71 | 0.62 | 0.62 | 0.62 | 0.56 | 0.54 |
| TTL/f | 3.27 | 3.17 | 3.12 | 2.82 | 3.40 | 3.41 | 3.22 | 3.37 | 2.64 | 2.55 | 2.48 | 2.54 |
| DT11/ImgH | 0.12 | 0.13 | 0.12 | 0.14 | 0.36 | 0.41 | 0.24 | 0.41 | 0.15 | 0.15 | 0.19 | 0.20 |
| f/R1 | 3.98 | 3.09 | 2.59 | 1.72 | 0.63 | 1.24 | 1.31 | 1.37 | 1.71 | 1.71 | 1.67 | 1.63 |

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly comprising, sequentially from an object side to an image side along an optical axis:

a first lens, having positive refractive power; and at least one subsequent lens having refractive power, wherein ImgH/(To*Tan(FOV/2))>1.0, where ImgH is half of a diagonal length of an effective pixel area on an image plane of the optical imaging lens assembly, To is a distance along the optical axis from an object being photographed to an object-side surface of the first lens, and FOV is a maximal field-of-view angle of the optical imaging lens assembly, wherein ΣAT/Td<0.3, and wherein ΣSAT is a sum of spaced intervals along the optical axis between each two adjacent lenses among all the lenses, and Td is a distance along the optical axis from the object-side surface of the first lens to an image-side surface of the lens closest to the image plane.

2. The optical imaging lens assembly according to claim 1, wherein an F-number Fno1 of the optical imaging lens assembly satisfies Fno1>3.5, where an object distance is finite, and an F-number Fno2 of the optical imaging lens assembly satisfies Fno2≥1.0, where the object distance is infinite.

3. The optical imaging lens assembly according to claim 1, wherein the optical imaging lens assembly further includes a stop, and Sd/Td≤0.7, where Sd is a distance along the optical axis from the stop to the image-side surface of the lens closest to the image plane, and Td is a distance along the optical axis from the object-side surface of the first lens to the image-side surface of the lens closest to the image plane.

4. The optical imaging lens assembly according to claim 1, wherein ΣCT/TTL<0.5, where ΣCT is a sum of center thicknesses along the optical axis of all the lenses, and TTL is a distance along the optical axis from the object-side surface of the first lens to the image plane of the optical imaging lens assembly.

5. The optical imaging lens assembly according to claim 1, wherein 0.5<BFL/TTL<0.9, where BFL is a distance along the optical axis from the image plane to the image-side surface of the lens closest to the image plane, and TTL is a distance along the optical axis from the object-side surface of the first lens to the image plane of the optical imaging lens assembly.

6. The optical imaging lens assembly according to claim 1, wherein 2<TTL/f<4, where TTL is a distance along the optical axis from the object-side surface of the first lens to the image plane of the optical imaging lens assembly, and f is a total effective focal length of the optical imaging lens assembly.

7. The optical imaging lens assembly according to claim 1, wherein DT11/ImgH<0.5, where DT11 is an effective radius of the object-side surface of the first lens, and ImgH is half of the diagonal length of the effective pixel area on the image plane of the optical imaging lens assembly.

8. The optical imaging lens assembly according to claim 1, wherein 0.5<f/R1<5, where f is a total effective focal length of the optical imaging lens assembly, and R1 is a radius of curvature of the object-side surface of the first lens.

9. The optical imaging lens assembly according to claim 1, wherein 0<f/f1<2.5, where f is a total effective focal length of the optical imaging lens assembly, and f1 is an effective focal length of the first lens.

10. The optical imaging lens assembly according to claim 1, wherein TTL/To≤3.0, where TTL is a distance along the optical axis from the object-side surface of the first lens to the image plane of the optical imaging lens assembly, and To is a distance along the optical axis from the object being photographed to the object-side surface of the first lens.

11. The optical imaging lens assembly according to claim 1, wherein f*tan(FOV/2)/ImgH<0.5, where f is a total effective focal length of the optical imaging lens assembly, ImgH is half of the diagonal length of the effective pixel area on the image plane of the optical imaging lens assembly, and FOV is the maximal field-of-view angle of the optical imaging lens assembly.

12. An optical imaging lens assembly comprising, sequentially from an object side to an image side along an optical axis:

a first lens, having positive refractive power; and at least one subsequent lens having a refractive power, wherein an F-number Fno1 of the optical imaging lens assembly satisfies Fno1>3.5, where an object distance is finite, and an F-number Fno2 of the optical imaging lens assembly satisfies Fno2≥1.0, where the object distance is infinite, wherein 2<TTL/f<4, and where TTL is a distance along the optical axis from an object-side surface of the first lens to an image plane of the optical imaging lens assembly, and f is a total effective focal length of the optical imaging lens assembly.

13. The optical imaging lens assembly according to claim 12, wherein DT11/ImgH<0.5, where DT11 is an effective radius of the object-side surface of the first lens, and ImgH is half of a diagonal length of an effective pixel area on the image plane of the optical imaging lens assembly.

14. The optical imaging lens assembly according to claim 12, wherein 0.5<f/R1<5, where R1 is a radius of curvature of the object-side surface of the first lens.

15. The optical imaging lens assembly according to claim 12, wherein 0<f/f1<2.5, where f1 is an effective focal length of the first lens.

16. The optical imaging lens assembly according to claim 12, wherein TTL/To≤3.0, where To is a distance along the optical axis from an object being photographed to the object-side surface of the first lens.

17. The optical imaging lens assembly according to claim 12, wherein f*tan(FOV/2)/ImgH<0.5, where ImgH is half of a diagonal length of an effective pixel area on an image plane of the optical imaging lens assembly, and FOV is a maximal field-of-view angle of the optical imaging lens assembly.

* * * * *